(12) United States Patent
Koifman et al.

(10) Patent No.: US 10,862,574 B2
(45) Date of Patent: Dec. 8, 2020

(54) PARTIAL UPLINK REPEATER SYSTEM, METHOD AND COMPUTER PROGRAM PRODUCT

(71) Applicant: Elta Systems Ltd., Ashdod (IL)

(72) Inventors: Gil Koifman, Petach-Tikva (IL); Yaakov Shoshan, Ashkelon (IL)

(73) Assignee: ELTA SYSTEMS LTD., Ashdod (IL)

( * ) Notice: Subject to any disclaimer, the term of this patent is extended or adjusted under 35 U.S.C. 154(b) by 24 days.

(21) Appl. No.: 16/233,945

(22) Filed: Dec. 27, 2018

(65) Prior Publication Data
US 2019/0207668 A1   Jul. 4, 2019

(30) Foreign Application Priority Data
Dec. 31, 2017   (IL) .......................................... 256681

(51) Int. Cl.
| | |
|---|---|
| *H04B 7/14* | (2006.01) |
| *H04W 72/04* | (2009.01) |
| *H04B 7/155* | (2006.01) |

(52) U.S. Cl.
CPC ........... *H04B 7/14* (2013.01); *H04B 7/15542* (2013.01); *H04W 72/044* (2013.01); *H04W 72/0413* (2013.01)

(58) Field of Classification Search
CPC ... H04B 7/14; H04B 7/15542; H04W 72/044; H04W 72/0413
See application file for complete search history.

(56) References Cited

U.S. PATENT DOCUMENTS

| | | | |
|---|---|---|---|
| 4,475,243 A | 10/1984 | Batlivala | |
| 4,941,200 A | 7/1990 | Leslie et al. | |

(Continued)

FOREIGN PATENT DOCUMENTS

| | | |
|---|---|---|
| WO | 2011/092698 A1 | 8/2011 |
| WO | 2014/068555 A1 | 5/2014 |

OTHER PUBLICATIONS

Choi et al., Y. S. "Simultaneous transmission and reception: Algorithm, design and system level performance", IEEE Transactions on Wireless Communications, 12(12), 5992-6010 (2013).

(Continued)

*Primary Examiner* — Mohammad S Anwar
(74) *Attorney, Agent, or Firm* — Browdy and Neimark, PLLC

(57) ABSTRACT

A method for repetition of uplink transmissions comprises: a repeater apparatus, aka uplink repeater, has a controller, a downlink receiver and an uplink transmitter and receiver. Use the downlink receiver to receive a downlink signal from a base station whose cell the uplink repeater is serving. For downlink frame(s) thus received: the controller demodulates at least a portion of the downlink frame and extracts MAP_D data describing allocation of an uplink transmission in upcoming uplink frame(s) to be transmitted after the downlink frame; controller determines a subset of UL transmission allocations to be repeated, to define a subset of mobile stations in the cell, whose uplink transmissions are to be repeated; the uplink receiver receives the UL transmissions to be repeated from each mobile station, and repeats the UL transmissions to be repeated by commanding the UL transmitter to send the content.

28 Claims, 16 Drawing Sheets

Operation A. Receive DL signal from BS whose cell the uplink repeater is serving

↓

Operation B. For at least one DL frame or sub-frame transmitted by the BS and received by the repeater, e.g. a most recent downlink frame F, demodulate, extract the map information (or any equivalent), map_i, which describes allocation of UL transmissions

↓

Operation C. Determine the specific UL transmissions allocations (e.g. resource blocks or bursts) which are to be repeated, e.g. the UL transmissions of a mobile station

↓

Operation d. For each UL transmission allocation which is to be repeated, receive the next UL transmission from the MS M which the repeater is "helping" or serving, and repeat, sending the repeated content in the allocations (e.g. time-frequency regions) allocated to M, either within the upcoming uplink frame or within an uplink frame which follows the upcoming uplink frame

(56) References Cited

U.S. PATENT DOCUMENTS

| | | | | |
|---|---|---|---|---|
| 6,470,195 B1* | 10/2002 | Meyer | .................. | H04B 7/0408 |
| | | | | 455/562.1 |
| 7,003,291 B2 | 2/2006 | Zhang | | |
| 9,124,333 B1* | 9/2015 | Mansour | .............. | H04B 7/0874 |
| 9,553,680 B1* | 1/2017 | Park | ....................... | H04B 15/00 |
| 2005/0232183 A1 | 10/2005 | Sartori et al. | | |
| 2008/0045270 A1* | 2/2008 | Suga | ................... | H04W 84/047 |
| | | | | 455/561 |
| 2008/0219229 A1* | 9/2008 | Zheng | ................ | H04B 7/15557 |
| | | | | 370/338 |
| 2010/0008312 A1* | 1/2010 | Viswanath | .......... | H04W 72/042 |
| | | | | 370/329 |
| 2010/0120397 A1 | 5/2010 | Kazmi et al. | | |
| 2010/0265842 A1* | 10/2010 | Khandekar | ......... | H04L 25/0202 |
| | | | | 370/252 |
| 2010/0304665 A1 | 12/2010 | Higuchi | | |
| 2012/0170504 A1* | 7/2012 | Hoymann | ............. | H04L 1/1854 |
| | | | | 370/312 |
| 2015/0270889 A1 | 9/2015 | Shoshan et al. | | |

OTHER PUBLICATIONS

Echo Cancelling_TRedess (2017) http://www.tredess.com/en/cancelador-ecos.

Dai et al., S.,"Study on the Echo Cancellation Technology for DVB-T Repeater", in Recent Advances in Computer Science and Information Engineering(pp. 115-122). Springer, Berlin, Heidelberg (2012).

Esser et al., D., "Improved antenna isolation in transmit/receive applications",in Proc. GeMiC pp. 1-5 (Mar. 2006 ).

\* cited by examiner

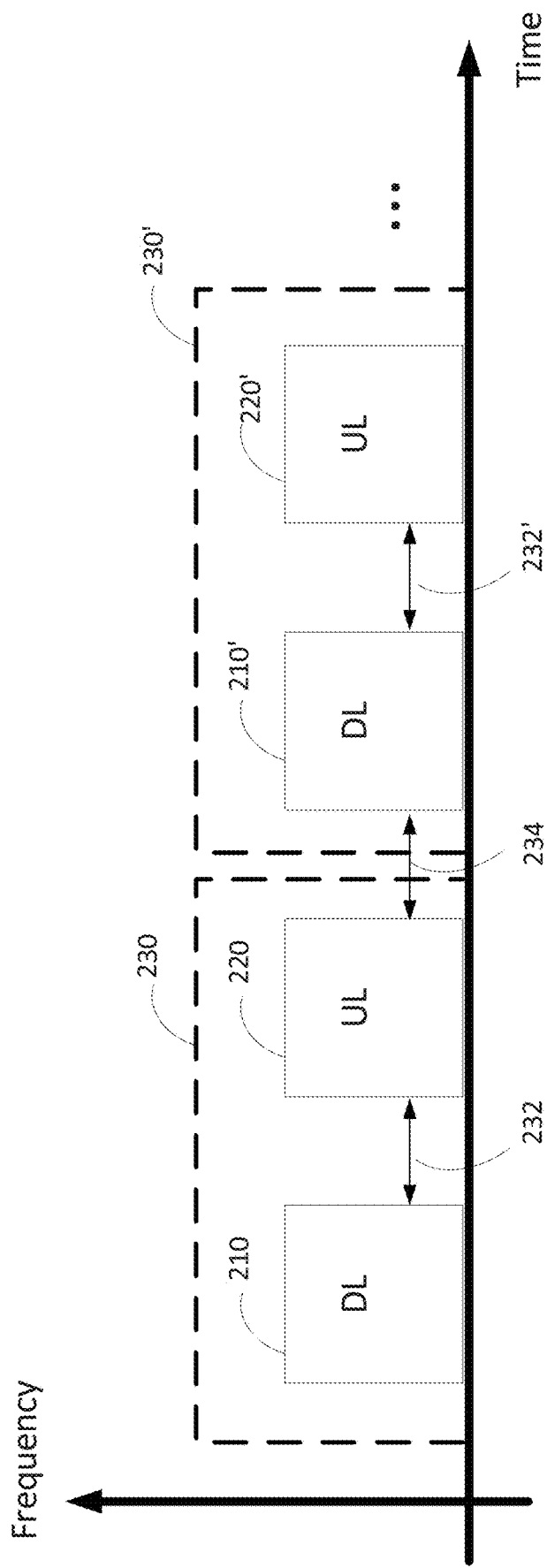

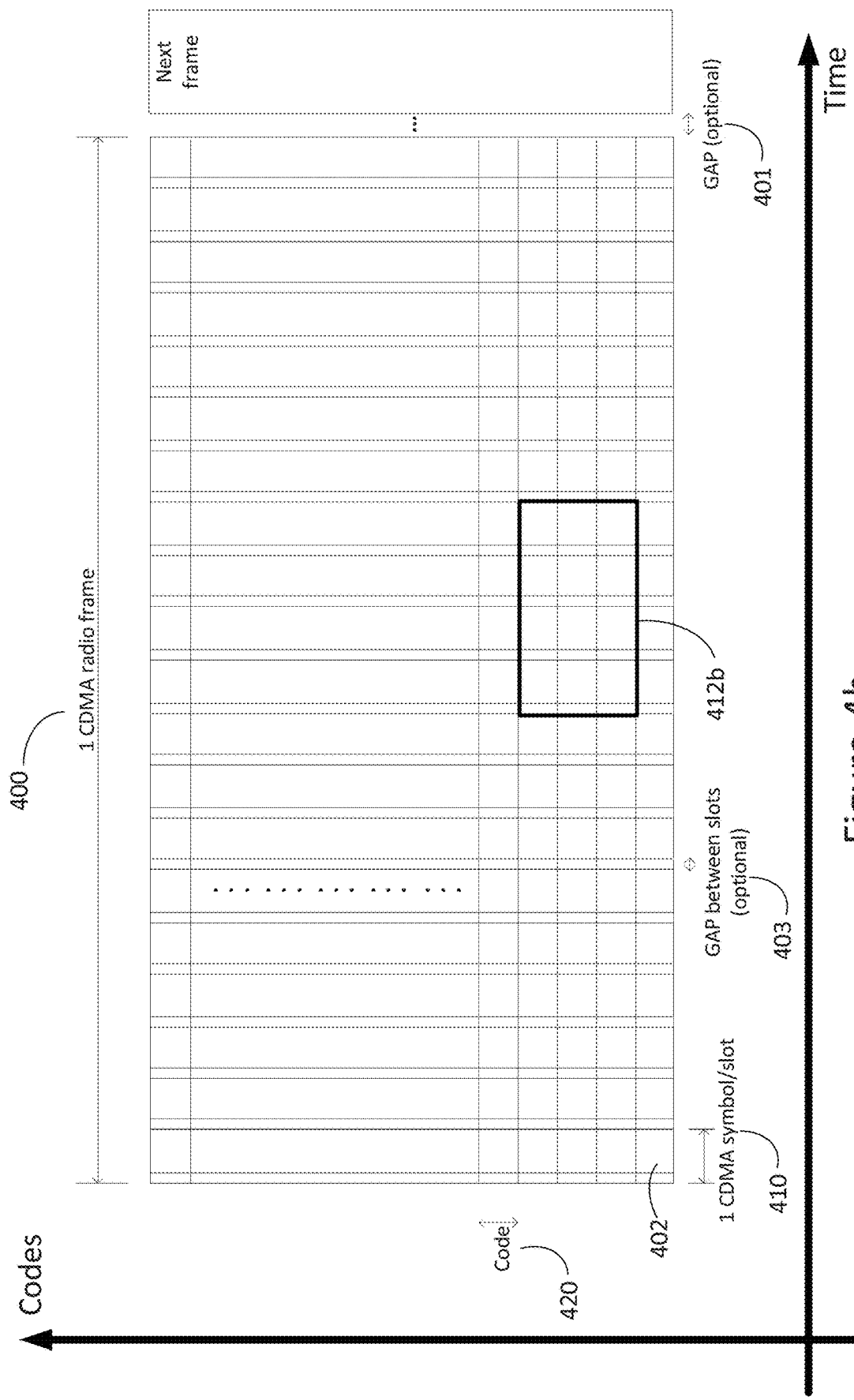

Fig. 7

Operation A. Receive DL signal from BS whose cell the uplink repeater is serving

↓

Operation B. For at least one DL frame or sub-frame transmitted by the BS and received by the repeater, e.g. a most recent downlink frame F, demodulate, extract the map information (or any equivalent), map_i, which describes allocation of UL transmissions

↓

Operation C. Determine the specific UL transmissions allocations (e.g. resource blocks or bursts) which are to be repeated, e.g. the UL transmissions of a mobile station

↓

Operation d. For each UL transmission allocation which is to be repeated, receive the next UL transmission from the MS M which the repeater is "helping" or serving, and repeat, sending the repeated content in the allocations (e.g. time-frequency regions) allocated to M, either within the upcoming uplink frame or within an uplink frame which follows the upcoming uplink frame

PARTIAL UPLINK REPEATER SYSTEM, METHOD AND COMPUTER PROGRAM PRODUCT

FIELD OF THE INVENTION

The present invention relates generally to wireless communication networks and more particularly to reception enhancement in cellular communication networks.

BACKGROUND OF THE INVENTION

A partial downlink repeater apparatus is described in co-owned patent document WO 2014068555.

Repeaters for use in cellular and other communication applications, e.g. in elevator piers or in large facilities, are well known. For example, a Wifi or other router may have a range of 30-50 m surrounding it; a repeater which receives an RF signal and retransmits it, may be positioned each 20-30 meters beyond this so as to effectively extend the coverage range of the router.

Layer 1, 2 and 3 relays are known.

Many different communication protocols such as LTE, 3G UMTS, WiMAX, WiFi are known.

State of the art repeaters and associated systems are described in U.S. Pat. No. 7,003,291 to ZHNAG, U.S. Pat. Nos. 4,475,243 and 4,941,200.

The disclosures of all publications and patent documents mentioned in the specification, and of the publications and patent documents cited therein directly or indirectly, and of specifications of mentioned protocols are hereby incorporated by reference.

SUMMARY OF THE INVENTION

Certain embodiments seek to provide an uplink repeater system which may be retrofitted to a legacy wireless/cellular network such as an LTE network which may be unaware of the uplink repeater and may not cooperative therewith, is described herein. Alternatively, the wireless/cellular network is aware of, and may control, the uplink repeater e.g. via an external uplink repeater-controlling module.

Certain embodiments seek to provide an uplink repeater system which overcomes characteristics of the uplink scenario e.g. whereas in the dl aka downlink, the signal is from the bs to the mobile station, in ul, the signal travels from the ms to the bs. The partial repeater receives signal content from ms and passes that signal content on, repeated, to the bs serving the ms; optionally only a specific portion of the signal is strengthened or improved (or not) and then re-transmitted. A difficulty is that in view of the triangle-inequality, the path from the tx (mobile station e.g.) to the dl repeater and then then back to the tx (bs e.g.) is longer than the direct path from tx to rx, such that synchronization may be used in certain embodiments to ensure that the proper location in the frame is maintained. Also, in uplink, the ms is not the only entity transmitting to the bs. The base station serving the mobile station transmits a map over its downlink. The map indicates scheduling of what is about to occur in the frame, e.g. which entity will be transmitting when (or where in the time-frequency domain) in the next 10 millisec (say). The map is typically read by the uplink repeater and info derived therefrom is then used by the ul repeater.

Several embodiments for retransmission of repeated UL transmissions are possible, such as but not limited to:

a. "Physical retransmission": UL repeater 605 receives signal 608, samples it, stores (e.g. in a memory) the relevant samples (i.e. the samples of the UL transmission to be repeated), and transmits the stored samples (thus forming signal 602*d*). Optionally, repeater 605 transmits the stored samples with amplification. Optionally, repeater 605 performs some filtering or equalization to the stored samples prior to transmitting them.

b. "Logical retransmission": UL repeater 605 receives signal 608, demodulate the UL transmissions to be repeated, extract their information bits (by performing, for example, synchronization algorithms, equalization, FEC decoding etc., and then re-modulating the information bits and reconstructing the physical signal of the UL transmissions. Finally, repeater 605 transmits the reconstructed physical signal 602*d* to BS 101.

Furthermore, several optional embodiments are described below for where to locate or position the repeated UL transmissions, within which UL frame:

a. "In-Place" option: The retransmitted signal is transmitted by the repeater 605 onto the same allocated region/resource elements/bursts of the current UL frame/sub-frame as the original received UL transmission from MS 604. UL repeater is designed to introduce a minimal (low) delay/latency so as to maintain its transmission within the time boundaries which allow the BS 101 a proper reception with no interfering to other signals (e.g. a delay which is lower than a cyclic prefix duration in an OFDMA system; see e.g. the illustrations of FIG. 3*a*-3*d*). Said "In-Place" option is preferably applicable to the "physical retransmission" option described above.

"Out-of-Place" with fixed allocation aka "Out-of-Place—example 1": This option may be used when MS 604 is allocated a fixed allocation in the UL frame, by its (the mobile station's) scheduler. An allocation is deemed fixed if the allocation is in a fixed volume or size or place. For example, this may be either a fixed allocation in each frame or sub-frame, or a fixed allocation being allocated to the MS periodically once every several frame, or a fixed allocation being allocated to the MS in a non-periodic manner, once per several frames, as long as the allocated region/resource elements/bursts has the same allocation location within the frame and has the same modulation properties such as modulation scheme and coding scheme.

In this case, the retransmitted signal may be transmitted by the repeater 605 onto the same allocated region/resource elements/bursts as the original received UL transmission, but in one of the next frames in which the MS 604 is allocated with an opportunity to transmit, (and NOT in the current frame). This option is applicable both for the "physical retransmission" and to the "logical retransmission" options as described above.

b. "Out-of-Place" with non-fixed allocation aka "Out-of-Place—example 2": This option may be used when MS 604 is allocated, by its scheduler, a allocation position in the UL frame which is dynamic rather than fixed (i.e. the allocation position within the sub-frame is dynamically changed between frames/sub-frames). This may be either a non-fixed allocation position in each frame or sub-frame, or a non-fixed allocation position being allocated to the MS periodically once every several frame, or a non-fixed allocation position being allocated to the MS in a non-periodically manner, once per several frames, as long as the allocated region/resource elements/bursts has the same allocation volume/size and has the same modulation properties such as modulation scheme and coding scheme. In this case, the retransmitted signal may be transmitted by the repeater 605 onto the new allocation (region/resource elements/bursts) in one of the next sub-frames in which the MS 604 is allocated with an opportunity to transmit (i.e. new allocation position within a new subframe). This option is applicable for the "logical retransmission" options as described above.

c. "Out-of-Place" with dynamic allocation properties aka "Out-of-Place—example 3": This option may be used when MS 604 is allocated with a dynamic allocation in the UL frame, not only in its allocation position but also in the allocation volume/size or in the allocation modulation properties (e.g. modulation scheme or coding scheme). In this case, the repeater 605 may comprise an elastic buffer, or a queue, in which it stores the demodulated information bits, and then re-modulates and retransmits those information bits according to the new allocation position/size/modulation properties, in one of the next sub-frames in which the MS 604 is allocated with an opportunity to transmit (i.e. new allocation position within a new subframe). This option is applicable for the "logical retransmission" options as described above.

Alternatively to or in addition to using "Out-of-Place" embodiments described herein, the UL repeater may implement an "Interleaved transmission" scheme. An advantage of this scheme is in ensuring that the Tx signal of the Repeater does not interfere with the operation of the Repeater Rx. In this scheme, the UL repeater alternates between "Receive periods" in which the repeater receives but does not transmit, and "Transmit periods" in which the repeater transmits but does not receive. For example, the alternations may be on a frame basis, i.e. use a frame N which includes an allocation to the served MS as a "Receive period", and use the next coming frame, N+1, that includes an allocation to the same served MS, as a "Transmit period". In another example, the Receive and Transmit periods may (each) span over several frames which include allocations to the served MS. Typically, during each Receive period, the UL repeater receives the signals sent by the served MS, but does not transmit (or transmits "silence"). During the Transmit period, the UL repeater transmits the repeated signal towards the BS, but does not operate its receiver to receive signals from the MS. This scheme helps the UL repeater to receive the MS properly (during the receive period) without interference from the repeater Tx signal. Typically, the data packets which were originally sent by the MS during the transmit period, are not received by the UL repeater, and are thus not repeated, therefore the BS may not receive them properly, in which case the MS may request retransmission of these data packets (e.g. using ARQ or HARQ mechanisms at the MAC protocol layer).

The following terms may be construed either in accordance with any definition thereof appearing in the prior art literature or in accordance with the specification, or to include in their respective scopes, the following:

map: any data stipulating uplink time-frequency allocation between plural mobile stations. This data may be in any format such as but not limited to the format of the UL-MAP signal in WiMAX 802.16. Or, in LTE, the UL allocations are described in the DCI (Downlink Control Information).

A map is intended to include any indication (provided e.g. by a base station) of an available allocation (e.g. time-frequency portion or region of at least one uplink frame) for the uplink repeater described herein, e.g. any indication indicative of a future allocation e.g. time-frequency portion of at least one uplink frame, that at least one mobile station's uplink is about to enjoy. The indication may for example comprise (a) allocation information typically reaching the repeater before the mobile station actually uses that allocation, e.g. in time to allow the repeater to share that allocation with the mobile station or (b) information regarding past allocations from which information regarding future allocation/s, may be deduced, e.g. in time to allow the repeater to share that allocation with the mobile station.

BER: Bit Error Rate measurement e.g. ratio of number of bits received erroneously at the receiver (eg bs) to the total number of bits sent by transmitter (e.g. ms).

BLER: Block Error Rate measurement. A receiver measurement used in conformance testing of GPRS/EGPRS mobiles. Retransmission is done for the blocks which are received in error. BLER is the ratio of received erroneous blocks to the total number of data blocks transmitted.

DBLER: Data Block Error Rate measurement. Received data blocks in error/Total number of transmitted blocks)

Resource block: intended to include the meaning of the term in LTE documentation.

Burst: intended to include the meaning of the term in WIMAX documentation.

At least the following embodiments are thus provided:

Embodiment 1

A method for repetition of uplink transmissions, the method comprising:

A. providing a repeater apparatus, aka uplink repeater, aka partial uplink repeater, having a controller, a downlink receiver and an uplink transmitter and receiver, and using the downlink receiver to receive a downlink aka DL signal from a base station aka BS whose cell the uplink repeater is serving, and, for at least one downlink frame D thus received:

b. using the controller to demodulate at least a portion of the downlink frame D and to extract therefrom, MAP_D data describes allocation of an uplink aka UL transmissions in at least one upcoming uplink frame to be transmitted after downlink frame D;

c. using the controller to determine a subset of UL transmission allocations to be repeated thereby to define a subset of mobile stations in the cell, whose uplink transmissions the repeater apparatus is to repeat, d. using the uplink receiver for receiving the the subset of UL transmission to be repeated, aka content, from each mobile station in the subset of mobile stations, and repeating the subset of UL transmission to be repeated by commanding the UL transmitter to send the content.

Embodiment 2

A method according to any of the preceding embodiments wherein the repeating includes sending the content in the time-frequency regions within an upcoming uplink frame which follows immediately after the downlink frame D.

Embodiment 3

A method according to any of the preceding embodiments wherein the repeating includes sending the content in the time-frequency regions within a subsequent uplink frame which follows an upcoming uplink frame which follows immediately after the downlink frame D.

Embodiment 4

A method according to any of the preceding embodiments wherein the portion of the downlink frame D comprises a sub-frame.

Embodiment 5

A method according to any of the preceding embodiments wherein the subset of allocations was decided in advance and stored in a repeater memory accessible by the controller and wherein the using the controller to determine the subset comprises retrieving the subset.

Embodiment 6

A method according to any of the preceding embodiments wherein the using the controller to determine the subset of UL transmission allocations to be repeated comprises deciding, on-the-fly, by analyzing the map_D data, which UL transmission allocations are to be repeated hence belong to the subset of UL transmission allocations to be repeated.

Embodiment 7

A method according to any of the preceding embodiments wherein for at least one individual mobile station in the subset of mobile stations, the time-frequency region within an uplink frame, in which the individual UL transmission allocation in the subset will be repeated, comprises a time-frequency region allocated to the individual mobile station.

Embodiment 8

A method according to any of the preceding embodiments wherein the MAP_D data describes allocation of UL transmissions in an upcoming uplink frame to be transmitted immediately after downlink frame D.

Embodiment 9

An uplink signal reception enhancement system (aka partial uplink repeater) operative to repeat at least a portion of at least one uplink transmission, the system being operative in conjunction with a cellular communication network having plural mobile stations transmitting uplink signals which are received by a base station which transmits downlink signals including uplink time-frequency allocation maps, the apparatus comprising:
 a downlink receiver dl-Rx;
 an uplink receiver ul-Rx;
 an uplink transmitter ul-Tx; and
 a controller communicating with the receivers dl-Rx and ul-Rx and with the transmitter ul-Tx, and configured
  to control the dl-Rx to receive at least a portion of at least one downlink signal including at least one map transmitted to the dl-Rx over a downlink
  to control the ul-Rx to receive and de-modulate at least a portion of at least one uplink signal transmitted to the ul-Rx by at least one mobile device/station and to extract at least a portion of an uplink time-frequency allocation map from the uplink signal and to control the ul-Tx to repeat at least a portion of at least one uplink signal received by the ul-Rx, including using the map to determine a time-frequency frame location at which to transmit the uplink signal,
thereby to provide partial repeater functionality operative to enhance quality of reception, by the base station, of at least a portion of at least one uplink signal received by the uplink receiver.

Embodiment 10

A system according to any of the preceding embodiments wherein a configurable antenna array and/or at least one configurable beamforming scheme is provided and is configured by the system to enhance, despite presence of other interfering mobile stations, the uplink receiver's quality of reception from at least one given mobile station whose uplink signal reception by the base station is to be enhanced.

The scheme may for example comprise a delay-and-sum beamformer scheme in which the beamformer is steered to a designated direction by selecting appropriate phases for each antenna and/or a Null-steering beamformer scheme and/or a Frequency domain beamformer scheme.

This given ms whose uplink signal reception by the base station is to be enhanced may be a mobile station which belongs to a predetermined group of ms's such as but not limited to mobile stations having a specific MS user/number/ID/user-type.

For example, a cellular network operator may be contractually obliged to provide a certain group of mobile stations whose id or type is such-and-such, with a higher quality of service than the operator is contractually obliged to provide to mobile stations whose id or type is not such-and-such.

The given ms may be an ms which currently or habitually consumes certain cellular network services.

Or, the given ms may be one which is known to be poorly received by the bs serving it (e.g. as indicated by measurements of signal strength or signal quality or BER or BLER transmitted over downlink by the BS and therefore intercepted by the partial repeater's downlink receiver.

Embodiment 11

A system according to any of the preceding embodiments wherein the given mobile station's location is known to the system, and wherein the controller configures the beamforming scheme or the antenna array to improve uplink reception from the given mobile station, according to the location thereof.

Embodiment 12

A system according to any of the preceding embodiments wherein the controller uses adaptive tracking/adjusting algorithms to configure the beamforming scheme or the antenna array, to improve uplink reception from the given mobile station.

Embodiment 13

A system according to any of the preceding embodiments wherein a unique identification of at least one given mobile station whose uplink signal reception by the base station is to be enhanced, is provided to the system by an external source.

Embodiment 14

A system according to any of the preceding embodiments wherein a unique identification of at least one given mobile station whose uplink signal reception by the base station is to be enhanced is determined by internal system logic.

Embodiment 15

A system according to any of the preceding embodiments wherein the unique identification comprises location of the given mobile station.

Embodiment 16

A system according to any of the preceding embodiments wherein the ul-Rx includes an Interference Canceller (IC) algorithm operative to improve uplink reception quality from at least one given mobile station whose uplink signal reception by the base station is to be enhanced.

Embodiment 17

A system according to any of the preceding embodiments wherein the controller is operative to control the ul-Tx to repeat only a portion of at least one uplink signal received by the ul-Rx, including using the map to determine a time-frequency frame location at which to transmit the uplink signal, thereby to provide partial repeater functionality operative to enhance quality of reception, by the base station, of only a portion of at least one uplink signal received by the uplink receiver.

Embodiment 18

A method according to any of the preceding embodiments and also comprising determining respective allocations within an uplink frame, in which to repeat UL transmissions of respective mobile stations in the subset of mobile stations respectively and wherein the content is sent by the UL transmitter in the allocations respectively.

Embodiment 19

A method according to any of the preceding embodiments wherein the allocations comprise respective time-frequency regions.

Embodiment 20

A method according to any of the preceding embodiments wherein the repeater apparatus alternates between:
silent periods in which the repeater's uplink receiver receives an MS that the repeater is serving, without interference from the repeater's Tx signal because the repeater does not transmit during the silent periods, and transmission periods in which the repeater repeats signals received from at least one MS during previous silent periods, and wherein at least one signal received from a given MS, M, during an allocation A is repeated by the repeater in a transmission period coinciding with a "subsequent" allocation which is granted to the MS M by the BS subsequent to allocation A.

Embodiment 21

A computer program product, comprising a non-transitory tangible computer readable medium having computer readable program code embodied therein, the computer readable program code adapted to be executed to implement a method for repetition of uplink transmissions, the method comprising:

A. providing a repeater apparatus, aka uplink repeater, aka partial uplink repeater, having a controller, a downlink receiver and an uplink transmitter and receiver, and using the downlink receiver to receive a DL signal from a BS whose cell the uplink repeater is serving, and, for at least one downlink frame D thus received:

b. using the controller to demodulate at least a portion of the downlink frame D and to extract therefrom, $MAP_{13}$ D data describes allocation of UL transmissions in at least one upcoming uplink frame to be transmitted after downlink frame D;

c. using the controller to determine a subset of UL transmission allocations to be repeated thereby to define a subset of mobile stations in the cell, whose uplink transmissions the repeater apparatus is to repeat, d. using the uplink receiver for receiving the the subset of UL transmission to be repeated, aka content, from each mobile station in the subset of mobile stations, and repeating the subset of UL transmission to be repeated by commanding the UL transmitter to send the content.

Embodiment 22

A method according to any of the preceding embodiments wherein repeating an original uplink signal comprises retransmitting, including transmitting the original uplink signal as received.

Embodiment 23

A method according to any of the preceding embodiments wherein repeating an original uplink signal comprises amplifying the original uplink signal thereby to generate an amplified signal and transmitting the amplified signal.

Embodiment 24

A method according to any of the preceding embodiments wherein repeating an original uplink signal comprises demodulating the original uplink signal and extracting the original uplink signal's information bits, remodulating the information bits and reconstructing the original signal accordingly thereby to generate a reconstructed signal, and transmitting the reconstructed signal.

Embodiment 25

A method according to any of the preceding embodiments wherein the transmitting comprises "in-place" transmission onto an original allocation, in a current at least sub-frame, allocated to the original uplink signal received by the base station from the mobile station that the repeater is serving.

Embodiment 26

A method according to any of the preceding embodiments wherein transmitting comprises "out-of-place" transmission onto an original allocation, allocated to the original uplink signal received by the base station from the mobile station that the repeater is serving. in a subsequent at least sub-frame rather than in a current at least sub-frame.

Embodiment 27

A method according to any of the preceding embodiments wherein the transmitting comprises "out-of-place" transmission onto a new allocation allocated to the mobile station that the repeater is serving within a subsequent at least sub-frame, rather than to an original allocation, in a current at least sub-frame, allocated to the original uplink signal received by the base station from the mobile station that the repeater is serving.

Embodiment 28

A method according to any of the preceding embodiments wherein allocation varies not only in terms of position but also in terms of at least one of volume and modulation scheme and coding scheme and wherein the repeater comprises an elastic buffer operative to store information bits and wherein the transmitting comprises "out-of-place" transmission in at least one new allocation to the mobile station being helped, in at least one subsequent subframe.

BRIEF DESCRIPTION OF THE DRAWINGS

Certain embodiments of the present invention are illustrated in the following drawings:

FIG. 1b (Prior Art) depicts a cellular system comprising a plurality of cells 100, each of the cells is described above regarding FIG. 1a.

FIG. 2a (Prior Art) depicts a Time Division Duplexing (TDD) frame scheme, comprising a Downlink (DL) and an Uplink (UL) frame (or sub-frames), operative in a wireless or cellular system of FIG. 1b.

Several allocation technologies (also known as "Multiple Access" methods) are known in the art, e.g. OFDMA, CDMA and TDMA, further described below regarding FIGS. 3a-3d=ofdma, 4a-4b=cdma and 5=tdma.

Figure 3A:
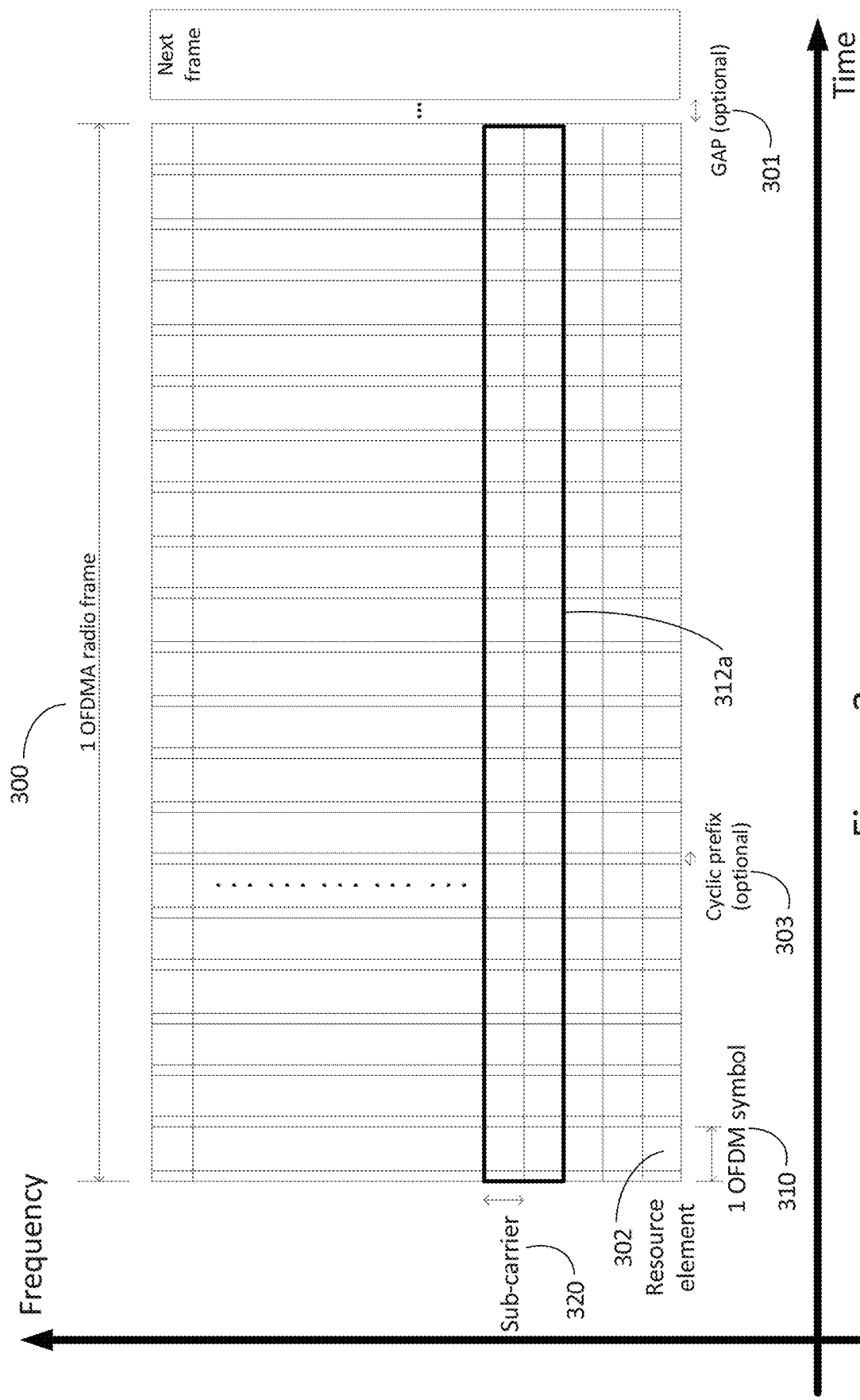

FIG. 3a (Prior Art) depicts an OFDMA radio uplink frame (or sub-frame) 300, in an OFDMA communication system, in which a mobile station is allocated with a portion of subcarrier/s along the whole duration of the frame.

Figure 3B:
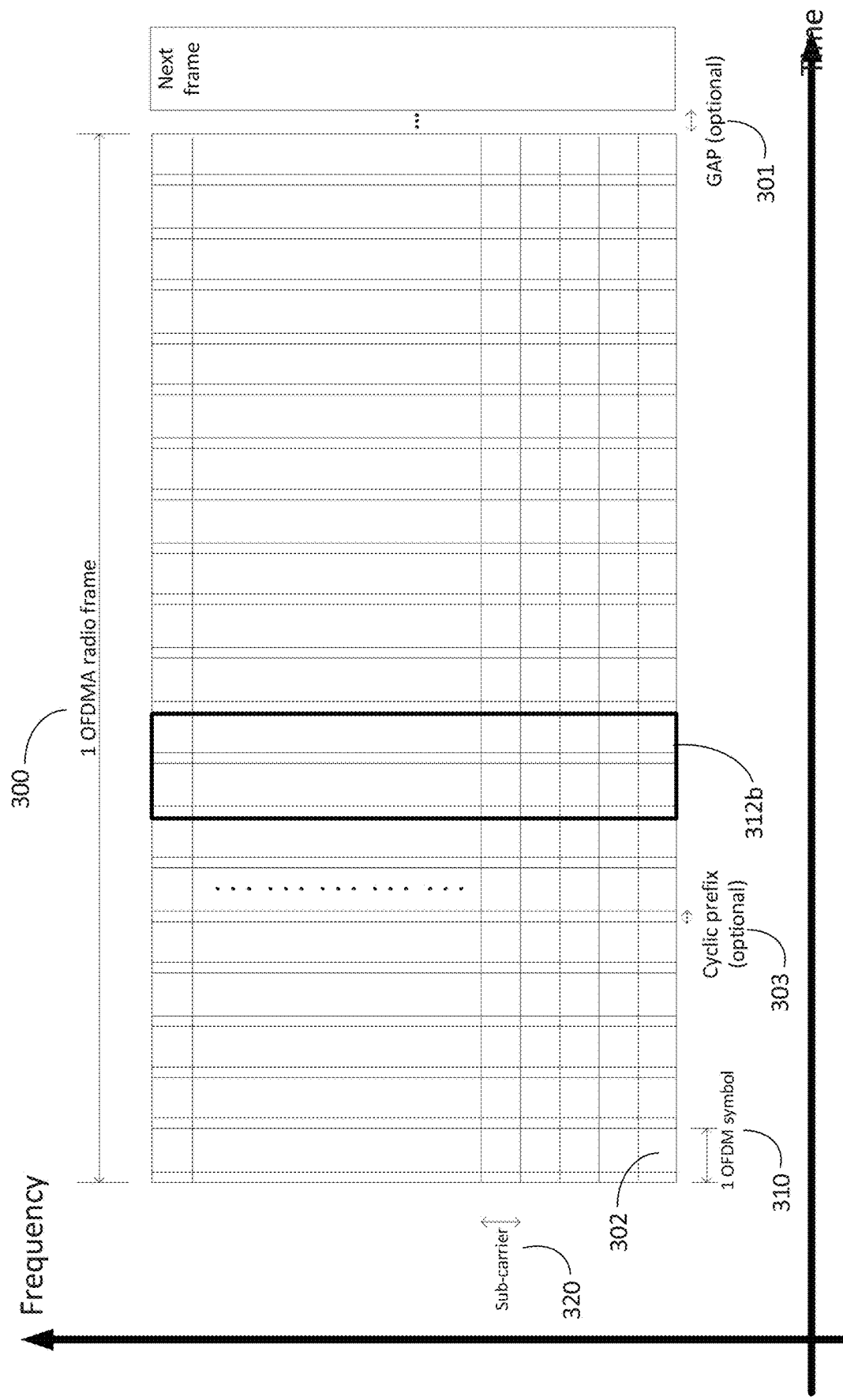

FIG. 3b (Prior Art) depicts another example of an OFDMA radio uplink frame (or sub-frame) 300, in which a mobile station is allocated with a portion of OFDM symbol/s in the frame along the whole frequency subcarriers of the frame.

Figure 3C:
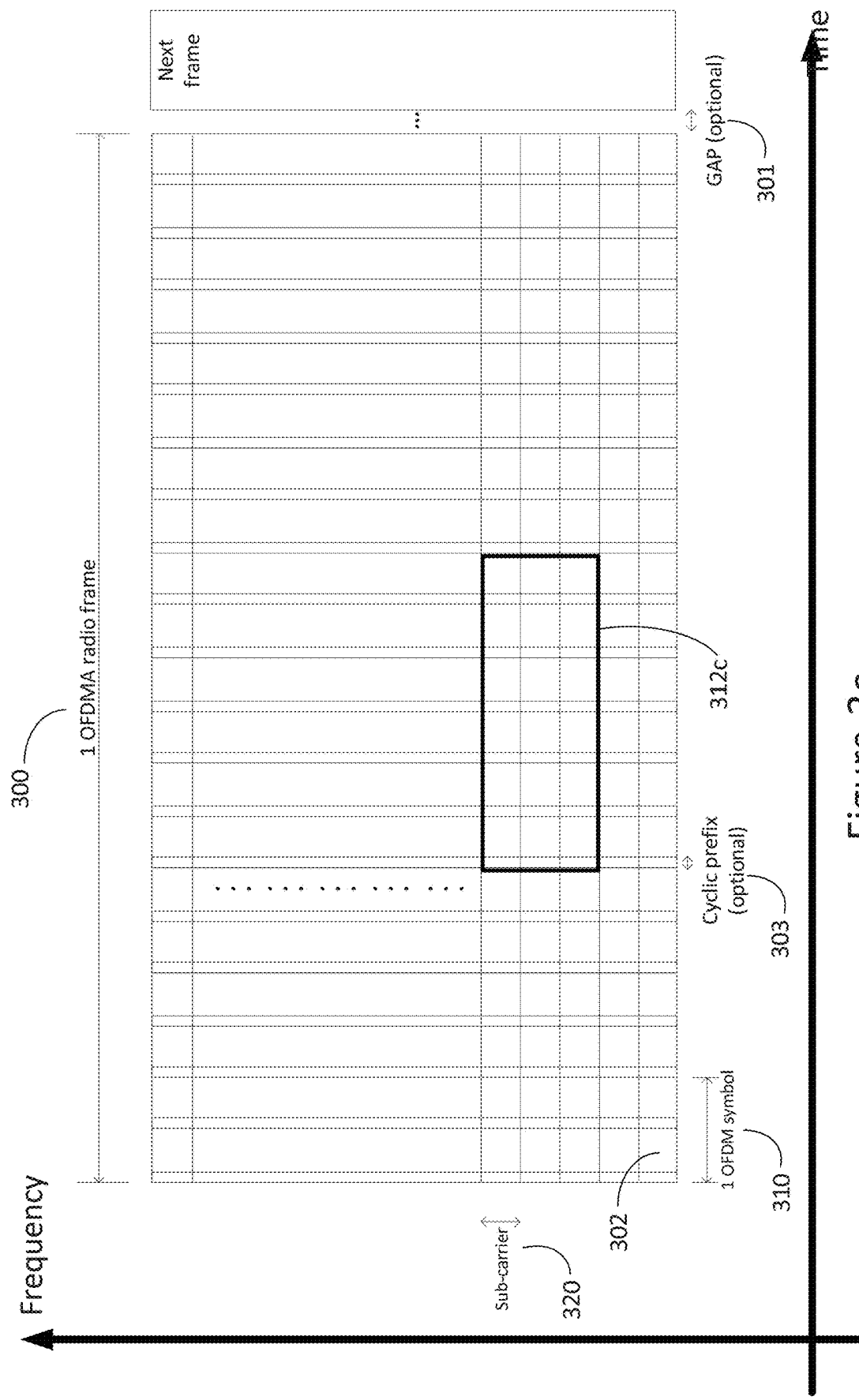

FIG. 3c (Prior Art) depicts another example of an OFDMA radio uplink frame (or sub-frame) 300, in which a mobile station is allocated with a portion of both the OFDM symbols in the frame (e.g. one, two or more OFDM symbols) and a portion of the subcarriers (e.g. one, two or more) of the frame 300. More than one such allocation (aka allocated region, which may have any suitable shape e.g. rectangular as in FIGS. 3a, 3b, 3c or snakelike as in FIG. 3d or as in WiMAX)) to the same mobile station may exist in the frame.

Figure 3D:
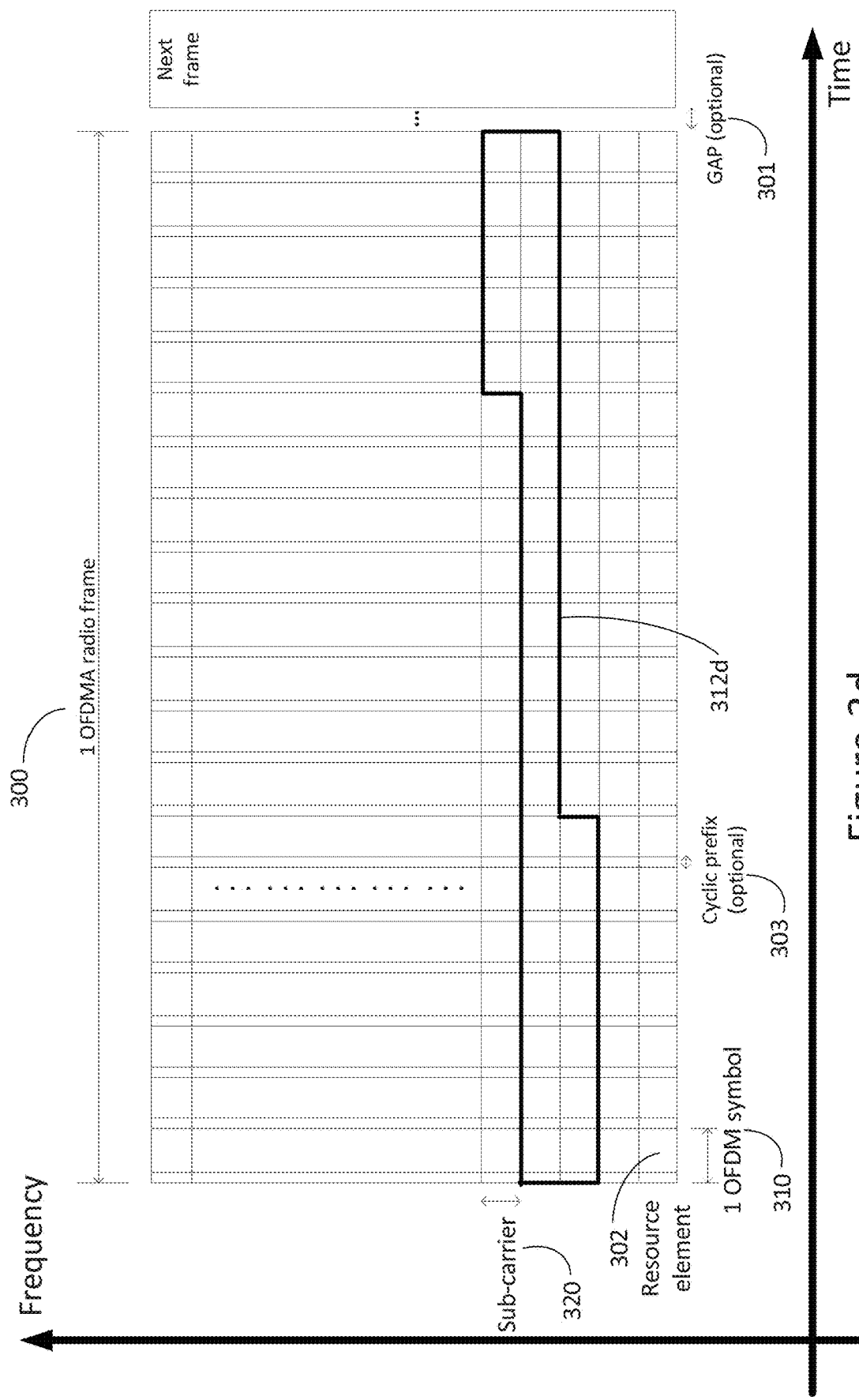

FIG. 3d (Prior Art) depicts another example of an OFDMA radio uplink frame (or sub-frame) 300, in which a mobile station is allocated with a region in the space of OFDM symbols and subcarriers of the frame 300. More than one such allocation to the same mobile station may exist in the frame.

Figure 4A:
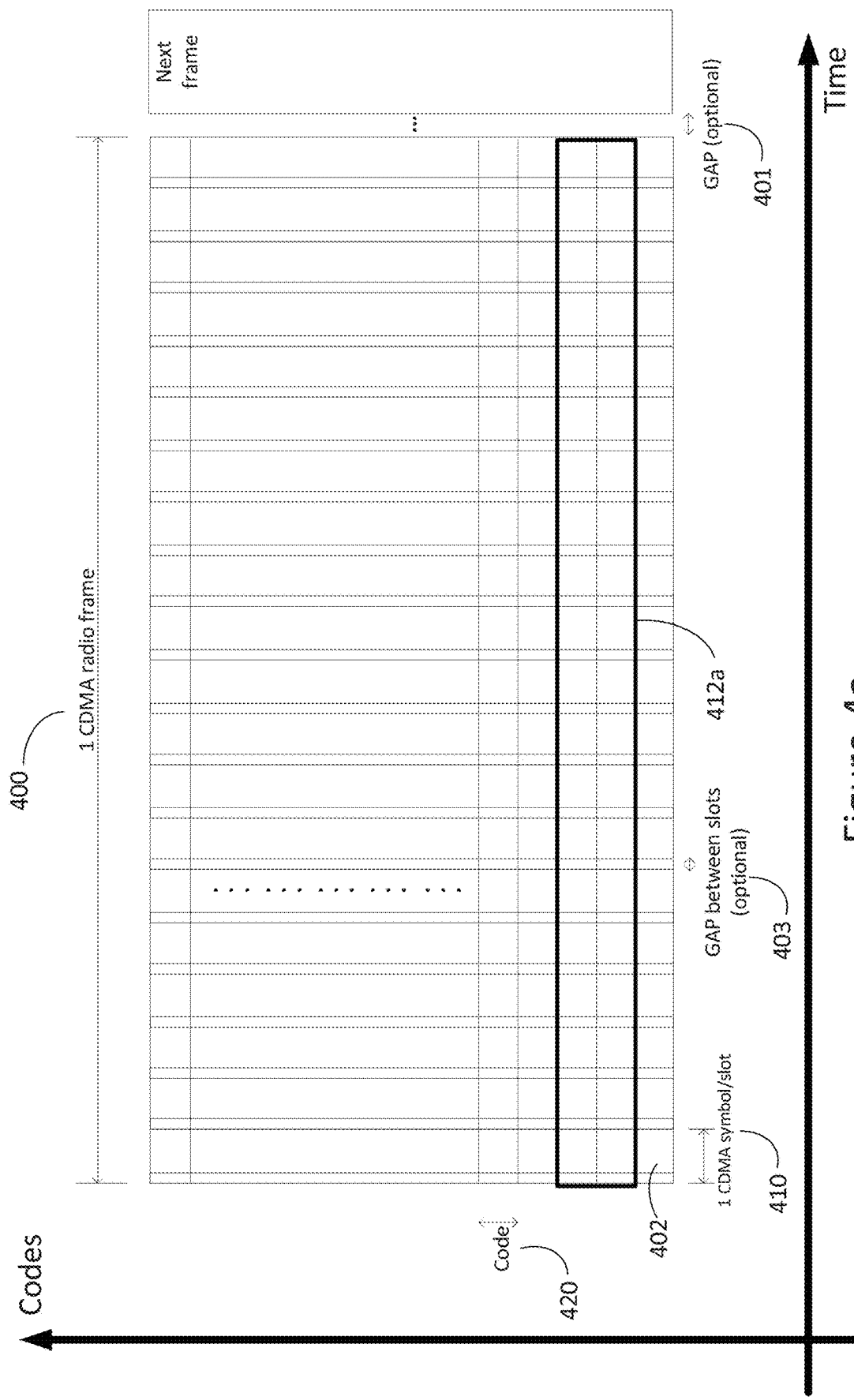

FIG. 4a (Prior Art) depicts a CDMA radio uplink frame (or sub-frame) 400, in a CDMA communication system, in which a mobile station is allocated with a portion of CDMA codes extending along the entire duration of the frame.

FIG. 4b (Prior Art) depicts another example of CDMA radio uplink frame (or sub-frame) 400, in a CDMA communication system, in which a mobile station is allocated with a region 412b which is "two-dimensional" in that it includes a portion of both the CDMA codes in the frame (e.g. one, two or more CDMA codes) and a portion of the CDMA slots (e.g. one, two or more) of the frame 400.

More than one such allocation to the same mobile station may exist in the frame.

Figure 5:
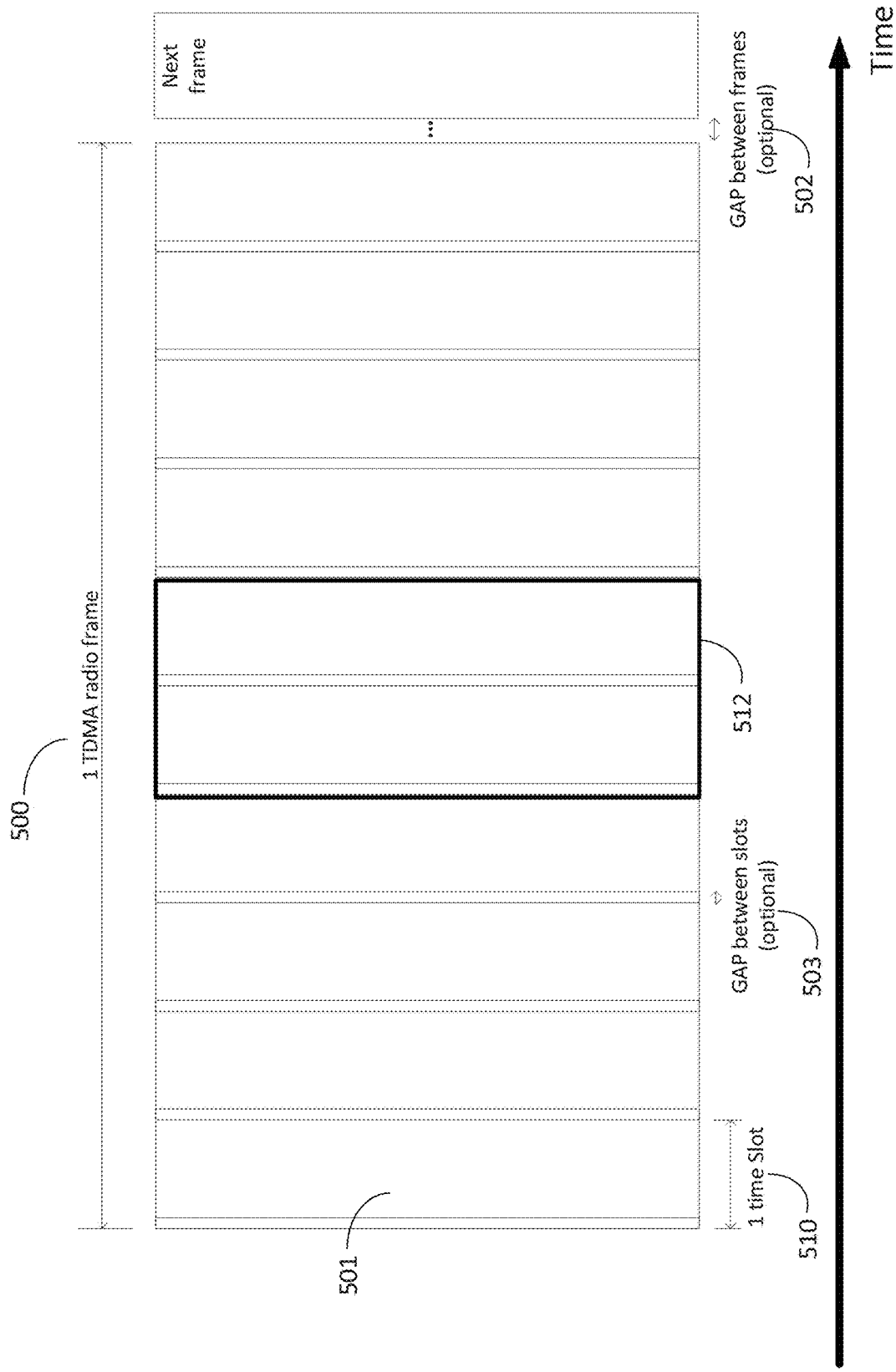

FIG. 5 (Prior Art) depicts a TDMA radio uplink frame (or sub-frame) 500 in a TDMA communication system in which a mobile station is allocated with a portion of the TDMA time slots along the duration of the frame.

More than one such allocation to the same mobile station may exist in the frame.

Figure 6:
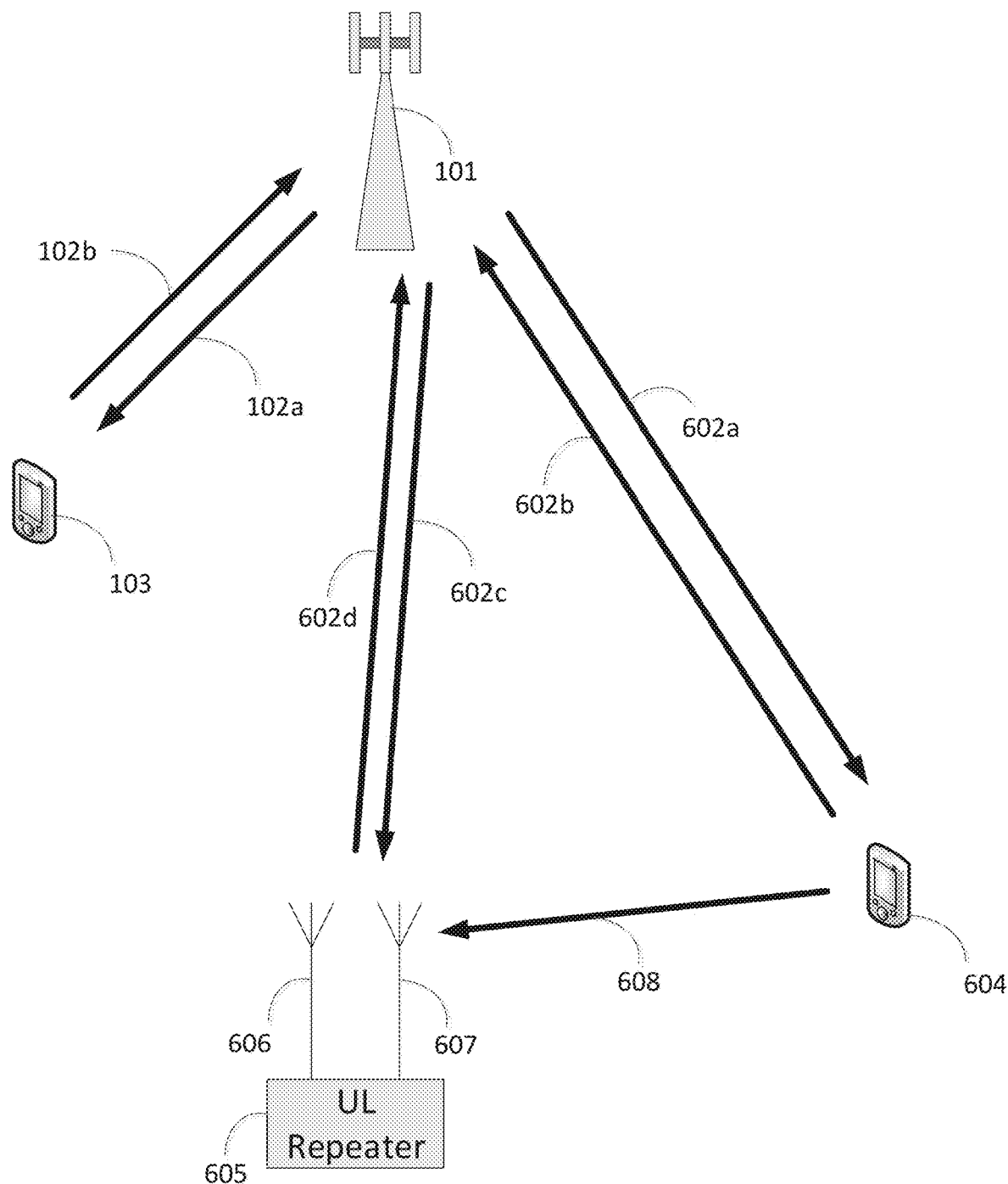

FIG. 6 is a semi-pictorial, semi-block diagram illustration of a cellular communication system in accordance with an embodiment of the present invention.

FIG. 7 is a simplified flowchart illustration of a method of operation for an uplink (UL) repeater constructed and operative in accordance with certain embodiments, whose method may be implemented by providing suitable logic in the controller governing operation of the repeater.

Figure 8:
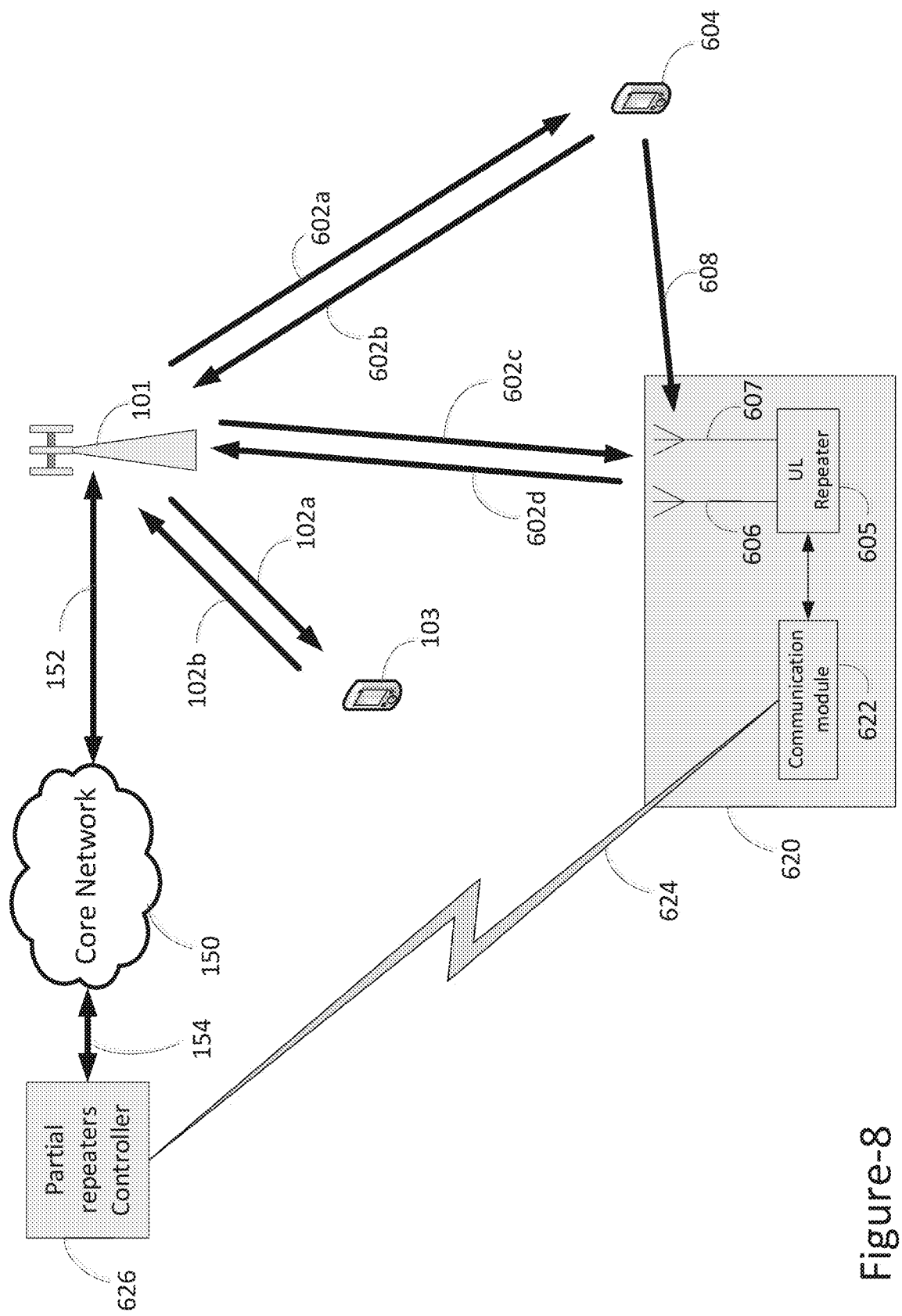
Figure 9:
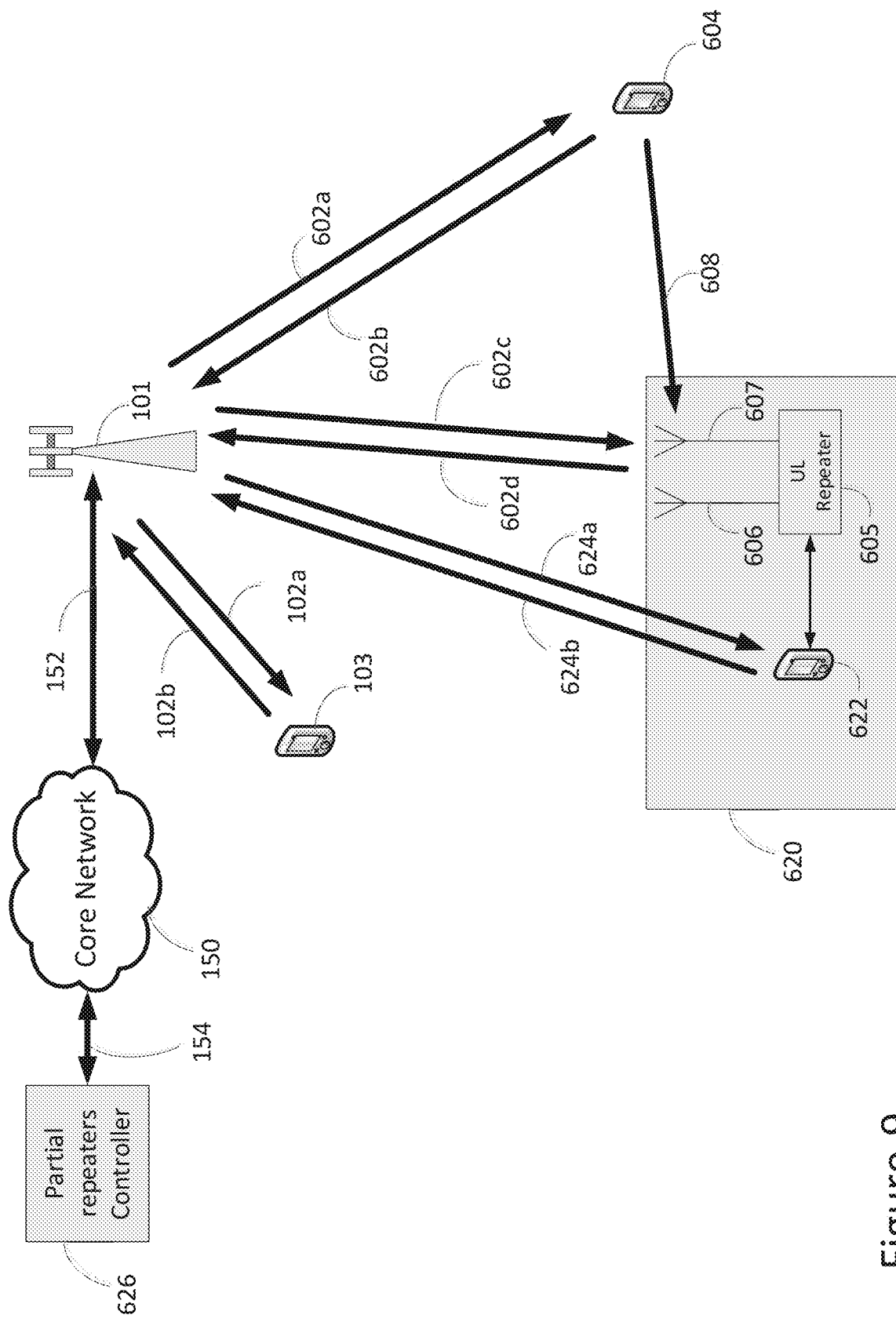

FIG. 8-9 are semi-pictorial, semi-block diagram illustrations of a cellular communication system in accordance with respective further embodiments of the present invention.

Figure 10:
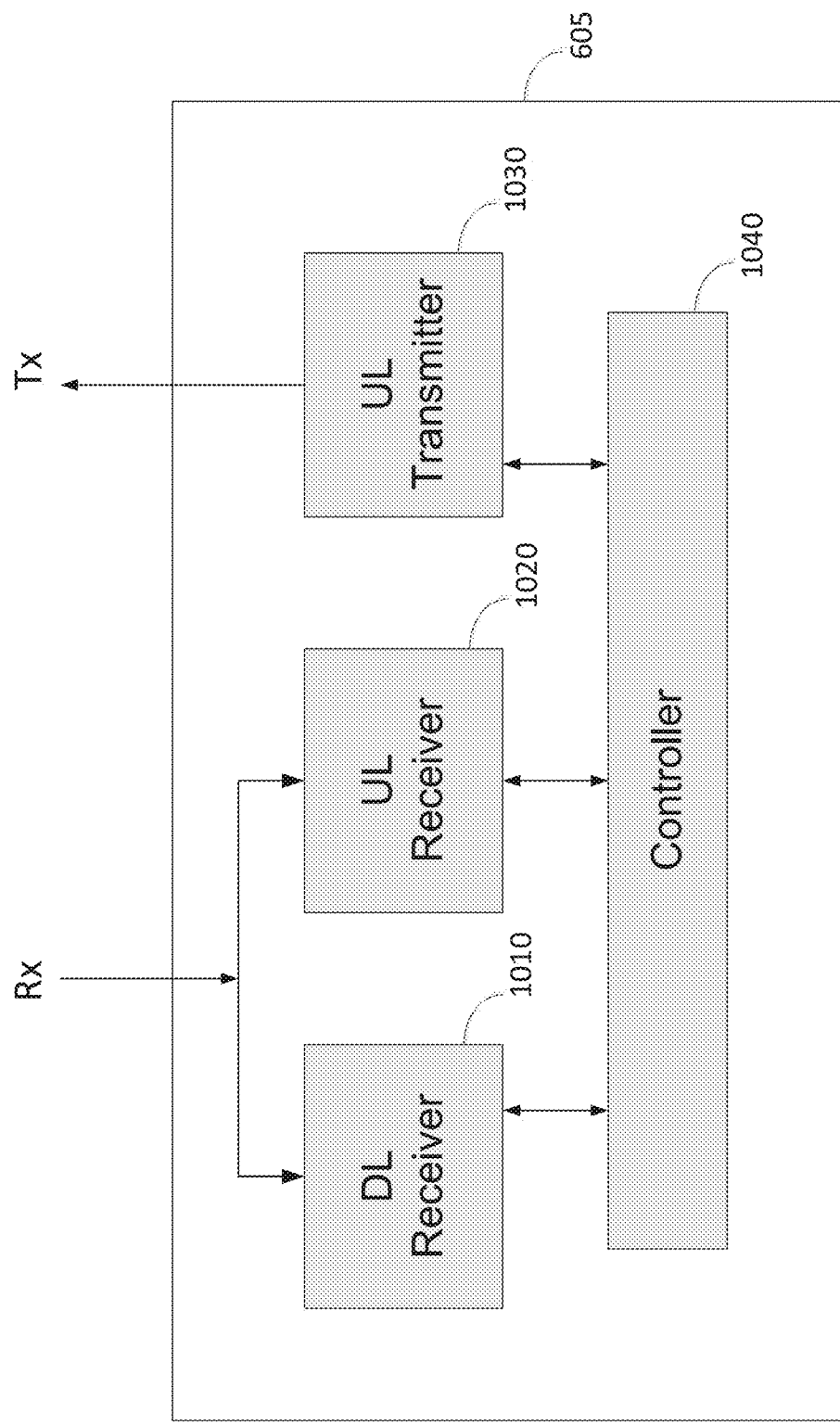
Figure 11:
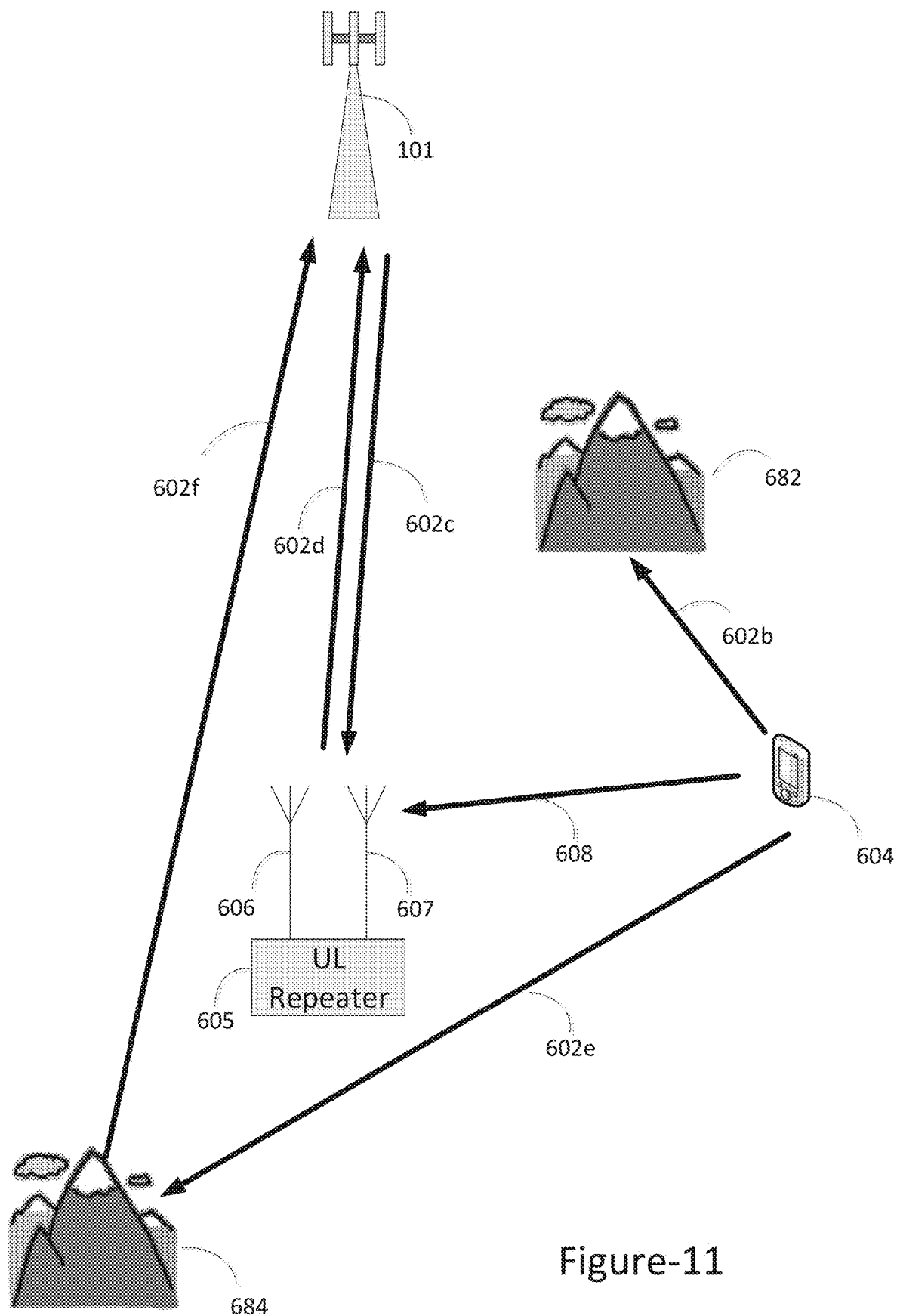

FIG. 10 is a semi-pictorial, semi-block diagram illustration of an UL (uplink) signal reception enhancement system which may serve as the repeater of FIG. 6;

FIG. 11 is an illustration of the cellular communication system of FIG. 6, operative in a geographical environment introducing topographic obstacles, in accordance with a further embodiment of the present invention.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1A:
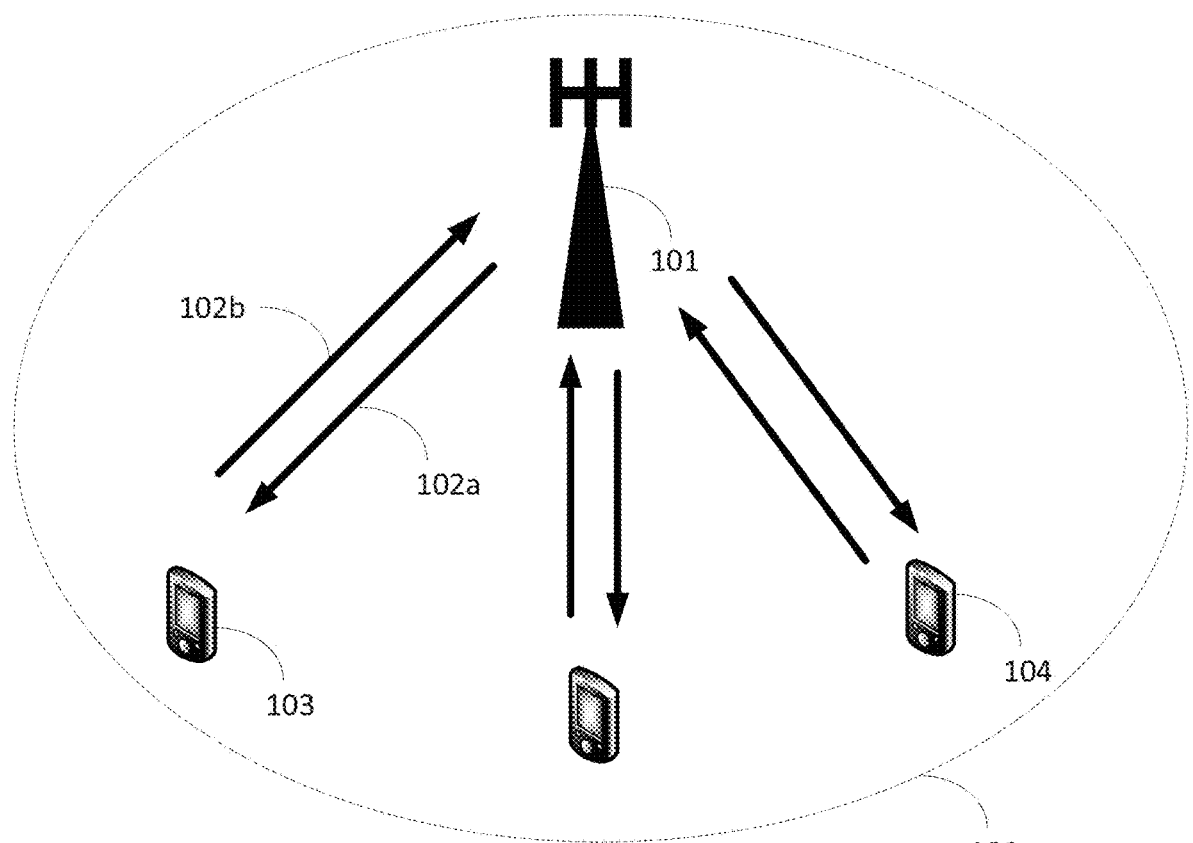
FIG. 1a (Prior Art) depicts a typical cell or other network portion 100 in a wireless e.g. cellular communication system.

FIG. 1a (Prior Art) depicts a typical cell or other network portion 100 in a wireless e.g. cellular communication system. A base station 101 transmits and receives signals to and from a plurality of mobile stations within its geographical coverage area. Such mobile stations are noted as 103 and 104. Each mobile station transmits an Uplink signal 102b to base station 101, and receives a Downlink signal 102a from base station 101. The communication system may be a cellular system, or alternatively any other wireless network.

The wireless communication system may implement one of the cellular standards, one of the wireless communication standards, or may implement some proprietary communication signals and protocols. For example, a cellular communication system may implement the 3GPP LTE standard, the WiMAX standard, the 3GPP WCDMA, HSPA or any other cellular standard. As a further example, the wireless communication system may implement one of the 802.11 WiFi standards.

Downlink 102a and Uplink 102b signals may be transmitted using TDMA, CDMA, FDMA, OFDMA, or any other suitable technology or combination of technologies.

Figure 1B:
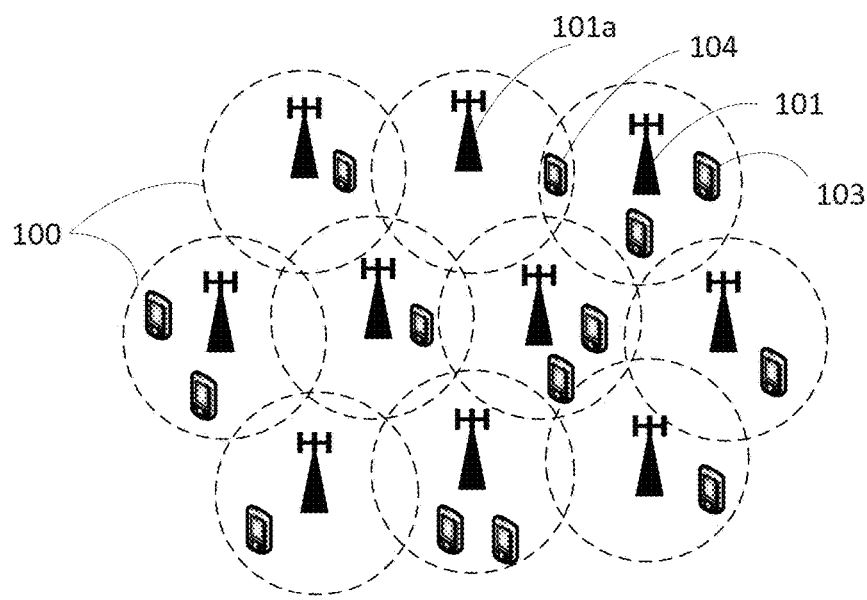

FIG. 1b (Prior Art) depicts a cellular system comprising a plurality of cells 100, each of the cells being described above regarding FIG. 1a. Some of the base stations may receive the uplink signals from their served mobile stations in low quality. Such low quality signals may be caused by multipath, fading, inter-cell interferences, attenuation, or any other cause or combination of such. In such conditions, it is difficult for the base station to maintain proper reception of the uplink signals from the mobile station.

For example, in one of the cells, base station 101 serves the mobile stations 103 and 104, amongst other mobile stations. Mobile station 104 happens to reside at the cell edge, i.e. at the edge of the geographical coverage area of base station 101; therefore base station 101 receives uplink signals from mobile station 104 with a low quality reception, while it receives uplink signals from mobile station 103 with a good quality reception.

Typically, in a cellular or wireless communication system, the uplink transmissions may include portions which are allocated to the different mobile station being served by the base station. Several allocation technologies (also known as "Multiple Access" methods) are known in the art, e.g. OFDMA, CDMA and TDMA, and are further described below regarding FIGS. 3a-3d, 4a-4b and 5.

FIG. 2a (Prior Art) depicts a Time Division Duplexing (TDD) frame scheme, comprising a Downlink (DL) and an Uplink (UL) frames (or sub-frames), operative in a wireless or cellular system of FIG. 1b. In TDD scheme, a downlink frame 210 (also called sub-frame) is transmitted using the whole frequency bandwidth allocated for the communication system, but the downlink transmission spans over only a portion of the time. An uplink frame 220 (also called sub-frame) is then transmitted using the whole frequency bandwidth allocated for the communication system, but the uplink transmission spans over only a portion of the time, which is different from the portion of the time used for the downlink transmission. Together, downlink sub-frame 210 and uplink sub-frame 220 constitute the overall Frame 230. The communication system uses a communication protocol in which successive frames are transmitted one after the other. Thus, after frame 230, a successive frame 230' is transmitted, comprising a downlink sub-frame 210' and an uplink sub-frame 220', similarly to frame 230, and so on. Optionally, a Gap 232 is placed in the time between downlink sub-frame 210 and uplink sub-frame 220. Alternatively or in addition, a Gap 234 may be placed in the time between uplink sub-frame 220 and downlink sub-frame 210.

Figure 2B:
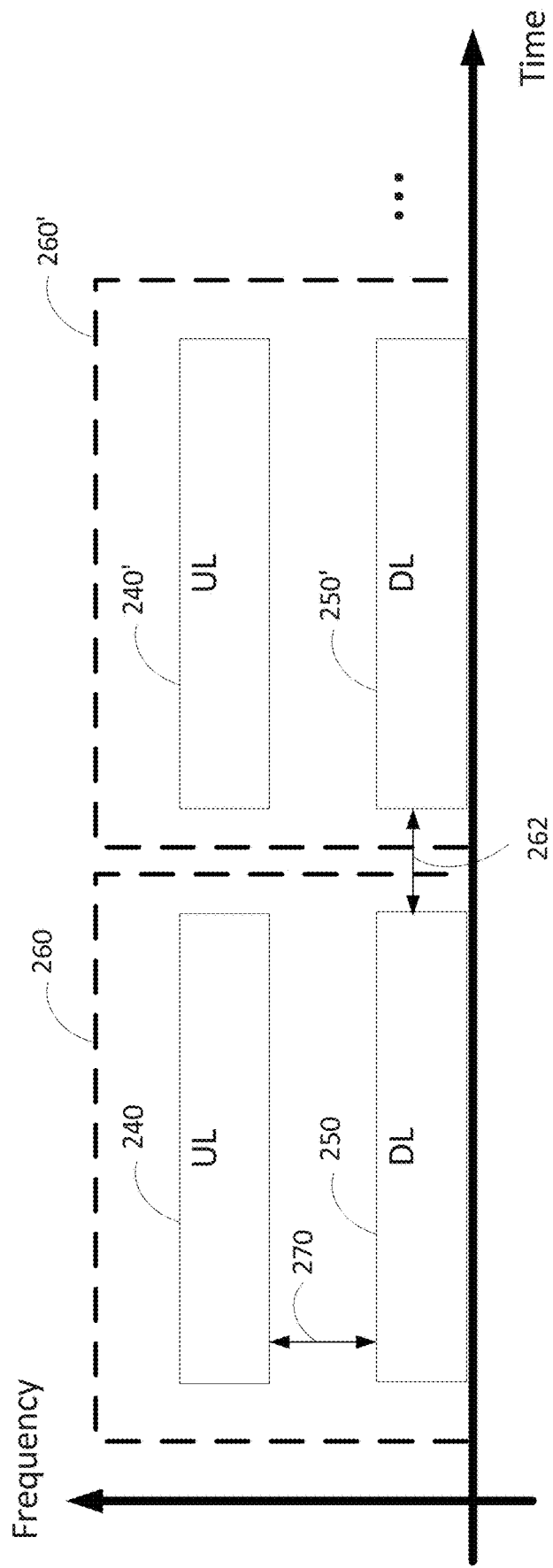
FIG. 2b (Prior Art) depicts a Frequency Division Duplexing (FDD) frame scheme, comprising a Downlink (DL) and an Uplink (UL) frames (or sub-frames), operative in a wireless or cellular system of FIG. 1b.

FIG. 2b (Prior Art) depicts a Frequency Division Duplexing (FDD) frame scheme, comprising a Downlink (DL) and an Uplink (UL) frames (or sub-frames), operative in a wireless or cellular system of FIG. 1b. In FDD scheme, a downlink frame 250 (also called sub-frame) is transmitted using only a portion of the frequency bandwidth allocated for the communication system. An uplink frame 240 (also called sub-frame) is transmitted using only a portion of the frequency bandwidth allocated for the communication system, which is different from the frequencies used for the downlink transmission. Uplink sub-frame 240 and downlink sub-frame 250 are transmitted concurrently along the time. Together, downlink sub-frame 250 and uplink sub-frame 240 constitute the overall Frame 260. The communication system uses a communication protocol in which successive frames are transmitted one after the other. Thus, after frame 260, a successive frame 260' is transmitted, comprising a downlink sub-frame 250' and an uplink sub-frame 240', similarly to frame 260, and so on. Optionally, a Gap 262 is placed in time between frames, e.g. between frame 260 and frame 260'. Optionally, a Gap 270 is placed in frequency between uplink sub-frame 240 and downlink sub-frame 250.

FIGS. 3a-3d, 4a-4b and 5 (Prior Art) depict various examples of uplink (UL) frame or sub-frame, using different methods for multiple access, as described below. Each of the figures below depicts only the UL frame, whereas the DL frame, although not depicted, is placed either between successive UL frames (TDD scheme), or concurrent to the UL frame but using different frequencies (FDD scheme), as described above regarding FIG. 2a and FIG. 2b.

FIG. 3a (Prior Art) depicts an OFDMA radio uplink frame (or sub-frame) 300, in an OFDMA communication system. Sub-Frame 300 refers to either uplink sub-frame 220 of FIG. 2a, or to uplink sub-frame 240 of FIG. 2b. Frame 300 comprises a plurality of OFDM symbols 310 in the time domain, and a plurality of subcarriers 320 in the frequency domain. An optional Gap 301 may be placed between successive frames 300. An optional Cyclic Prefix 303 may be provided between successive OFDM symbols in the time domain. The basic resource which can be allocated in the uplink transmission frame is resource element 302, which is the transmission of one subcarrier during one OFDM symbol length in time. A region of resource elements 312a is allocated to mobile station 103 of FIG. 1a, and mobile station 103 uses this allocated region to transmit its uplink signal to base station 101. In this example, the allocated region 312a consists of a portion of the subcarriers (one, two or more) along the whole duration of the frame 300. More than one such allocated region may exist in the frame.

FIG. 3b (Prior Art) depicts another example of an OFDMA radio uplink frame 300, in which the allocated region 312b is a portion of the OFDM symbols in the frame (one, two or more OFDM symbols) along the whole frequency subcarriers of the frame 300. More than one such allocated region may exist in the frame.

FIG. 3c (Prior Art) depicts another example of an OFDMA radio uplink frame 300, in which the allocated region 312c (sometimes termed herein "an allocation") is a portion of both the OFDM symbols in the frame (one, two or more OFDM symbols) and a portion of the subcarriers (one, two or more) of the frame 300. More than one such allocated region may exist in the frame.

FIG. 3d (Prior Art) depicts another example of an OFDMA radio uplink frame 300, in which the allocated region 312d is a "snake-like" region of resource elements.

The allocated region (or regions) in an OFDMA system may comprise any partial set of the resource elements 302 in frame 200, or any combination of the examples above.

FIG. 4a (Prior Art) illustrates a CDMA radio uplink frame (or sub-frame) 400, in a CDMA communication system. Sub-Frame 400 refers to either uplink sub-frame 220 of FIG. 2a, or to uplink sub-frame 240 of FIG. 2b. Frame 400 typically comprises a plurality of CDMA symbols or slots 410 in the time domain, and a plurality of CDMA codes 420 in the code domain. Each CDMA symbol typically comprises a series of CDMA chips. A gap 401 may optionally be provided between successive frames 400. Alternatively or in addition, an additional gap 403 may be provided between successive CDMA slots 410. A Resource element 402 is a basic resource which may be allocated in the uplink transmission frame. Resource element 402 is the transmission of one CDMA code during one CDMA slot length in time. A region of resource elements 412a is allocated to mobile station 103 of FIG. 1a, and mobile station 103 uses this allocated region to transmit its uplink signal to base station 101. In this example, the allocated region 412a consists of a portion of the CDMA codes (one, two or more) along the whole duration of the frame 400. More than one such allocated region may exist in the frame.

FIG. 4b (Prior Art) depicts another example of a CDMA radio uplink frame 400, in which the allocated region 412b is "two-dimensional" in that it includes both a portion of both the CDMA codes in the frame (one, two or more CDMA codes) and a portion of the CDMA slots (one, two or more) of the frame 400. More than one such allocated region may exist in the frame.

The allocated region (or regions) in a CDMA system may comprise any partial set of the resource elements 402 in frame 400, or any combination of the examples above.

FIG. 5 (Prior Art) illustrates a TDMA radio uplink frame (or sub-frame) 500, in a TDMA communication system. Sub-Frame 500 refers to either uplink sub-frame 220 of FIG. 2a, or to uplink sub-frame 240 of FIG. 2b. Frame 500 typically comprises a plurality of TDMA time slots 510 in the time domain A gap 502 may optionally be provided between successive frames 500. Alternatively or in addition, a gap 503 may optionally be provided between successive time slots 510. The basic resource to be allocated in the downlink transmission frame is resource element 501, which is the transmission of one TDMA time slot. A region of resource elements 512 is allocated to mobile station 103 of FIG. 1a, and mobile station 103 uses this allocated region to transmit its uplink signal to base station 101. In this example, the allocated region 512 consists a portion of the TDMA time slots (one, two or more) along the duration of the frame 500. More than one such allocated region may exist in the frame.

FIG. 6 is a semi-pictorial, semi-block diagram illustration of a cellular communication system in accordance with an embodiment of the present invention. Base station 101 serves a plurality of mobile stations, amongst them mobile station 103 and mobile station 604. Mobile station 103 receives the downlink signal 102a from base station 101, and base station 101 receives the uplink signal 102b from mobile station 103. Similarly, mobile station 604 receives downlink signal 602a from base station 101, and base station 101 receives, or is tuned to receive, the uplink signal 602b from mobile station 604. As an example, while base station 101 receives uplink signal 102b from mobile station 103 in proper quality, it receives the uplink signal 602b from mobile station 604 in low quality. According to some embodiments, base station 101 cannot receive uplink signal 602b at all.

Downlink signals 602a and 102a may be the same originated signal, but vary from each other when received by the mobile stations due to the attenuation, multipath, noise and other channel conditions. Alternatively, downlink signals 602a and 102a may be different, as a result of the communication protocol.

More than one mobile station in the cell may be received by base station 101 in low quality. Furthermore, optionally all of the mobile stations in the cell may be received by base station 101 in low quality.

In order to improve the quality of the uplink signal reception by base station 101, such as the reception of uplink signal of mobile station 604, an UL (uplink) repeater 605 or an entire population thereof, may be provided. UL (uplink) repeater 605 receives at least portions of the uplink signal transmitted by the mobile station 604 to the base station 101. Said portions of the uplink signal are referred to hereinafter as 608. UL repeater 605 also receives the downlink signal 602c transmitted by base station 101. Downlink signal 602c may be the same originated signal 602a or portions thereof. For example, UL repeater 605 may be configured to receive only one or more regions within the DL (downlink) frame, and these portions are referred to as signal 602c. Alternatively, signal 602c may vary from its corresponding portions in 602a when received by the uplink repeater 605, e.g. due to attenuation, multipath, noise and other channel conditions which may be different from those of mobile station 604.

Typically, uplink repeater 605 acquires the downlink signal parameters and adjusts its receiver to properly receive the downlink signals transmitted by base station 101. For example, DL (downlink) repeater 605 may acquire one or more of the carrier frequency, frequency offset, phase offset, timing offset, gain, modulation scheme and parameters, and any other signal parameters needed for proper reception of the downlink signals.

Typically, downlink signal 602c comprises at least the portion or portions within the DL frame which describe the mapping allocations of upcoming uplink (UL) transmissions (e.g. the UL-MAP signal in WiMAX 802.16). The UL repeater 605 receives signal 602c from the base station whose cell UL repeater 605 is serving, demodulates signal 605, and extracts, from the DL frame, the UL mapping allocations information (allocations to each mobile station, within the upcoming UL transmission from mobile stations to base station 101). Said UL mapping allocation information is referred to as the map hereinafter. Typically, the base station transmits a sequence of maps, and each map M_i describes allocations to each mobile station, within the upcoming UL transmission (e.g. the uplink transmission occurring just after map M_i is transmitted) from mobile stations to base station 101.

The map may comprise, as an example, modulation and coding scheme information for of each of the (upcoming uplink) transmissions of the mobile stations in the cell (each of the mobile stations being served by base station 101). The repeater may then employ this information, to receive the served MS properly and transmit properly to the BS—e.g. by demodulating the received signal according to its modulation parameters, as known from the modulation and coding scheme information for of each of the (upcoming uplink) transmissions.

Alternatively or in addition, the map may comprise, as an example, the location (e.g. along time-frequency axes) of each of these mobile stations' transmissions. In the case of an OFDM system, the location may be, as an example, the subcarriers and the OFDM symbols which form the region 312a, 312b, 312c or 312d of FIGS. 3a, 3b, 3c and 3d respectively. In the case of a CDMA system, the location may be, as an example, the CDMA codes and the CDMA slots/symbols which form the region 412a or 412b of FIGS. 4a and 4b respectively. In the case of a TDMA system, the location may be, as an example, the time slots which form the region 512 of FIG. 5.

Typically, the controller stores map information that the controller extracts from the DL, using conventional map-extraction techniques known in the art for each of various protocols such as LTE and WIMAX. Typically, a window of map information is stored, such that obsolete map information is discarded on an ongoing basis.

The map may comprise information (e.g. allocations) of the current UL frame, or the next UL frame, or of some future coming UL frame. Optionally, the map may comprise information about static (e.g. permanent) allocations, or about periodic allocations.

Use of the map is advantageous in facilitating uplink repetition by limiting interference, since uplink transmissions can, by virtue of map analysis, be limited only to regions allocated to certain mobile stations such as the mobile station to be repeated. Alternatively or in addition, use of the map is advantageous in allowing selective or partial repetition of uplink content. The map typically includes extensive information about who is transmitting what and when, hence can be used by the repeater to distinguish between information that should and should not be repeated—according to any suitable criteria which is discernable from the map information. For example, if the map indicates both identity (e.g. location) of the mobile station and the type of each mobile station's transmission (e.g. voice, data), the criteria of what should and should not be repeated may include identity and/or transmission type e.g. "repeat only voice being transmitted in uplink by mobile stations of category A" or "repeat only non-voice data being transmitted in uplink by mobile stations of category B". the criteria of what should and should not be repeated may also include criteria available from base station broadcasts such as BER and other quality criteria, as described herein. This criteria may of course be logically combined (e.g. and, or) with criteria discernable from the map information e.g., "repeat only voice being transmitted in uplink by mobile stations of category A AND having a BER below value x" or "repeat only non-voice data being transmitted in uplink, either by mobile stations of category B, OR by mobile stations whose BER is below y".

Alternatively or in addition, the criteria of what should and should not be repeated may also include criteria discernable from any other source e.g. a node of the cellular network e.g. base station or even core, which may provide the repeater with additional information about which mobile stations are sending what and when, over and above the map information and information broadcast between base station and its mobile stations, both of which are available even without cooperation, on the part of the cellular network, with the repeater.

In embodiments of the present invention, UL repeater 605 determines which mobile station (MS) to serve. Optionally, UL repeater 605 may serve more than one MS. In the example depicted in FIG. 6, UL repeater 605 serves mobile station (MS) 604, and does not serve MS 103. Optionally, UL repeater 605 may serve all mobile stations in the cell.

Alternatively, UL repeater 605 determines which specific UL transmission allocations to serve or which mobile station (MS) to serve according to a command from a controller, aka external controller, which, as described herein with reference to FIGS. 8-9, resides external to the repeater 605.

The determination of who to serve, may take place at any suitable periodicity (possibly but not necessarily the frame rate) and may take place on-occasion e.g. when triggered by an external event, or may take place only on-occasion e.g. only when triggered by an external event, and not periodically. If the determination is periodic, one possibility is for this determination to occur each time a map is read and just before an uplink is sent which repeats whichever mobile station is to be helped. The periodicity may for example be pre-configured. E.g. every frame, once per second, once per min, and so forth.

Any suitable criterion or logical or computational combination of criteria may be used e.g. by the UL repeater's controller, to determine which mobile station to serve and/or which specific UL transmission allocations e.g. allocated regions to serve (e.g. which regions/bursts/resource elements in the UL frame to serve). for example:

a. Optionally, UL repeater 605 selects which allocations e.g. allocated regions to serve based on at least one pre-configured MS user ID, username, number, address or user-type.

user_id/number may be, for example, the cellular number e.g. 050-7875523, or the sim card id which is burned onto the sim. The address may be, for example, the IP address or the MAC address that the MS is using. The user-type may be, for example, a group to which a given user belongs e.g. "vip users", "employees of xyz company", a group of users who paid for uplink repeater service (hence may be entitled to a higher quality of service), etc.

The above information may be configured into the controller of the repeater in any suitable manner e.g. manually or by controller 626 e.g. as described herein with reference to FIGS. 8-9.

It is appreciated that maps normally indicate inter alia the MS user ID, username, number, address and user-type of the various MSs in the cell in which the partial repeater is deployed.

b. Optionally, UL repeater 605 selects which allocations e.g. allocated time-frequency regions within frame/s to serve based on the service type of the MS which is being served by the allocations (e.g. voice service allocations, data service allocations, management & control allocations etc.). Service types may be extracted from higher protocol layers e.g. IP.

It is appreciated that various use-cases may create a situation in which it is desirable to repeat certain service/s but not other/s.

For example, in some use cases, it may be desirable (e.g. from a cost-effectiveness point of view) for a network to facilitate voice services, although not data services (since facilitation of reception of voice services is relatively easy to provide, relative to facilitation of reception of heavy data services), for MS suffering from poor reception. In other use-cases, it may be desirable from a cost-effectiveness point of view for a network to facilitate all or a subset of data services, although not voice services, for MS suffering from poor reception.

c. Optionally, UL repeater 605 selects which allocations to repeat (i.e. signals in which time-frequency regions will be repeated) according to indications, which may be transmitted by the BS and received inter alia by the partial repeater, that suggest that a specific MS is not properly received by the BS, or is received by the BS in low quality. (e.g. such indications may comprise data that BS and MS exchange and are received inter alia by the partial repeater in the same cell, such as but not limited to the following 4 types of data that that BS and MS exchange: measurements of signal strength or signal quality or BER or BLER..

d. Combinations of the above e.g. repeat only transmission from mobile stations whose username is x, and which are providing voice service, and which have a signal quality of less than threshold y.

In the example depicted in FIG. 6, the UL transmission allocations which are determined to be served are included in signal 608 from MS 604.

Typically, for each UL transmission allocation which is determined to be served, the UL repeater 605 receives the relevant UL transmission, and repeat the UL transmission by retransmitting it to BS 101. The retransmitted signal from repeater 605 to BS 101 is noted by signal 602d. Signal 602d is also referred to hereinafter as the "repeated signal". The retransmission of the UL transmissions helps BS 101 to receive them properly, thus enhancing the reception quality of the UL transmissions, originally transmitted from MS 604 to BS 101. Various embodiments (logical, physical) are described herein for the retransmission of the repeated UL transmissions.

Typically, UL repeater 605 transmits a repeated signal 602d. The repeated signal 602d may comprise at least a portion of the uplink signal 608. Alternatively or in addition the repeated signal 602d may comprise at least a modified portion of the received uplink signal 608. Such a modification may be, for example, one or more of the following: amplification, time shift, frequency shift, equalization, filtering, etc. Further, such a modification may be generated by the UL repeater 605 by demodulating and decoding the data of the uplink signal 608, and then recoding and remodulating at least portions of it to form the repeated signal 602d.

Optionally, UL repeater 605 may comprise a single antenna 606, which is used for both the reception of signals 602c and 608, and for the transmission of the repeated signal 602d. Further optionally, UL repeater 605 may use more than one antenna. UL repeater 605 may use antenna 606 for reception of signals 602c and 608, and antenna 607 for the transmission of the repeated signal 602d. Alternatively, UL repeater 605 may use antenna 606 for reception of signal 602c and for transmission of the repeated signal 602d, and antenna 607 for the reception of signal 608. Further optionally, several antennas may be used for reception or for transmission.

A geographical coverage area may be provided to the UL repeater 605 which defines which mobile stations are to be served by the repeater in that a mobile station is served by the repeater if and only if that mobile station is inside the geographical coverage area. Said provided geographical coverage area may be predetermined, or based on predetermined settings, or may be provided to the UL repeater 605 by manual user setting, which may vary from time to time. Further, it may be provided to the UL repeater 605 by the internal subsystem of the UL repeater itself, which dynamically controls and manages the geographical coverage area. For example, the UL repeater 605 may sense the uplink signals transmitted by mobile station 604, and adjust the geographical coverage area accordingly. Further, the geographical coverage area may be provided to the UL repeater 605 by an external system, connected to the UL repeater 605 by communication means, the external system dynamically controlling and managing the geographical coverage area.

Further optionally, UL repeater 605 may use a beam-forming scheme for the reception of signal 602c, for the reception of signal 608 or for the transmission of the repeated signal 602d. The beam-forming weights may be based on the provided geographical coverage area. The UL repeater 605 may optionally sense the uplink signals transmitted by mobile station 604 and base station 101, and adjust the beam-forming accordingly.

Further optionally, the UL repeater 605 may receive the UL signals related to more than one mobile station, and may transmit a repeated signal towards BS 101 comprising regions/allocations of more than one mobile station.

The repeated signal 602d may be transmitted with a higher transmission power (say, 100 W) than the received power level of signal 608 (say, 0.1 W). Further, the UL repeater 605 may transmit signal 602d with a power level higher than the original power transmitted by mobile station 604. Further, UL repeater 605 may dynamically control the transmitted power level of signal 602d according to the provided geographical coverage area.

According to certain embodiments, which are useful e.g. to ensure that the repeater (which is helping/serving mobile station M by using the allocation of mobile station M) does not cause the repeater's own transmissions to become confused or interfere with M's transmissions, the repeated signal 602d may be transmitted with a controlled, also termed herein "intentional", time shift (delay) so as to ensure the repeated signal 602d is received by BS 101 in proper synchronization with the corresponding portions of the uplink signal 602b. Typically, the proper synchronization is such so that the receiver of BS 101 may properly demodulate the overall signal it receives. For example, in an OFDMA scheme, the repeated signal 602d may be received by the BS 101 with a relative delay to the uplink signal 602b of up to the cyclic prefix duration since under these circumstances, the delay will be handled by the equalization inherent to OFDMA receivers. Further, the controlled time shift may be based on the provided geographical coverage area. Optionally, the time shift introduces such a delay so that the repeated signal 602d is transmitted onto allocations within the next frame, or beyond that.

The repeated signal 602d may be transmitted with a controlled frequency shift so as to make the repeated signal 602d to be received by BS 101 in proper frequency synchronization with the corresponding portions of the UL signal 602b. Typically, the proper synchronization is such that the receiver of BS 101 may properly demodulate the overall signal it receives. Further, the controlled frequency shift may be based on the provided geographical coverage area or on analysis of the mobile station 604 uplink signals and BS downlink 602c signals.

The uplink repeater of FIG. 6 (or of FIG. 10) may for example perform some or all of the following operations a-d as shown in FIG. 7. By way of example, in the operations below, each allocation is assumed to comprise a time-frequency region. This is the case e.g. in OFDM use-cases, however it is appreciated that more generally, e.g. in protocols other than OFDM, the allocations need not each comprise a time-frequency region.

Operation A. Receive DL signal from BS whose cell the uplink repeater is serving Operation B. For at least one DL frame or sub-frame transmitted by the BS and received by the repeater, e.g. a most recent downlink frame F, demodulate, extract the map information (or any equivalent), map_i, which describes allocation of UL transmissions (e.g. resource blocks or resource elements as in LTE, or bursts as in WIMAX which are examples of "allocated regions" as shown e.g. in FIGS. 3-5, e.g. at reference numeral 312C in an upcoming uplink frame (e.g. the uplink frame which will be transmitted right after downlink frame F). It is appreciated that the map information may describe allocations either the current frame or within subsequent frame/frames/sub-frames.

Operation C. Determine the specific UL transmissions allocations (e.g. resource blocks or bursts) which are to be repeated, e.g. the UL transmissions of a mobile station M such as MS 604. Allocations to be repeated may have been decided in advance (e.g. if the periodicity of deciding what to repeat, differs from the rate of frames), then stored in repeater memory and retrieved. Alternatively, allocations to be repeated may be decided on-the-fly in operation c (e.g. if the periodicity of deciding what to repeat, is exactly the rate of frames). This on-the-fly decision may include analyzing typically the most recently extracted map, map_i, extracted in operation B. Typically, a determination is also made of when (in what frequency-time region) to transmit in uplink the time-frequency region allocated to M.

The specific UL transmissions allocations (e.g. resource blocks or bursts) which are to be repeated may be determined e.g. according to one or any combination of:

c-1. the MS user/number/ID/user-type c-2. according to service used by the specific allocations (data, voice etc. e.g. as described in detail herein).

c-3. indications that suggest that a specific MS is not properly received by the BS, or received by the BS in a low quality. (e.g. to such indications could be measurements of signal strength or signal quality or BER or BLER that BS and MS exchange.

c-4. a command from a controller which resides external to the repeater, as in FIG. 9 in this embodiment, the external controller (inter alia) is aware of the repeater as opposed to other embodiments herein in which the repeater is "transparent" to other components. In practice, in FIG. 9 where the external controller is linked to the core network, the external controller may belong to and be deployed by to a company that manufactures the core network, or the external controller may belong to and be deployed by a cellular operator company which operates the external controller inter alia. Nevertheless, the external controller is, optionally, not connected to the core network, but only to the (one or many) repeater(s), in which case, in practice, the external controller may belong to a 3rd party which deploys the repeaters and the external controller.

Operation d. For each UL transmission allocation which is to be repeated, receive the next UL transmission from the MS M which the repeater is "helping" or serving, and repeat, sending the repeated content in the allocations (e.g. time-frequency regions) allocated to M, either within the upcoming uplink frame as explained herein, or within an uplink frame which follows the upcoming uplink frame, also as explained herein.

The transmission may be repeated physically or logically e.g., respectively, either by storing and playing back or by extracting information and then reconstructing a physical signal accordingly. In particular:

"physical retransmission" or "playback" option: Said "repeat" comprises retransmitting or playing back (albeit with an optional amplification) the received UL physical signal, e.g. by storing the received UL samples and transmitting the stored samples either as-is or, optionally, with amplification. Optionally (not shown in FIG. 6 for simplicity), the controller has memory to store these samples or to store information bits in the "LOGICAL" (aka extraction) embodiment described herein.

"extraction" aka "Logical retransmission" option: Said "repeat" comprises demodulating the UL transmissions, extracting their information bits (e.g. performing, inter alia, some or all of synchronization, equalization, FEC decoding), and then remodulating the information bits and reconstructing the physical signal of the UL transmission accordingly. conventional synchronization, equalization, and FEC decoding techniques may be used as known in the art of digital communication.

The location of the repeated UL transmission within the frame may be either in or out of place.

It is appreciated that the decision of whether to use physical or logical or in-place or out of place or interleaved embodiments, may be made at any suitable juncture. For example, this decision may be made by the manufacturer of the repeater who would then configure the controller of FIG. 6 accordingly. Or, a single repeater may have plural options (may be designed to selectably operate in accordance with all or a subset of the above embodiments) in which case logic may be provided to automatically select one of the embodiments, or options, depending on any suitable use-case specific selection criterion. Or, an suitable conventional user input mechanism may be provided to allow an end-user to select which embodiment of option is employed by the plural option repeater.

If the repeater has prior information of the network (e.g. of the scheduler's behaviour e.g. whether or not the scheduler's allocations are fixed), the repeater may use the fixed allocation scheme. If the repeater lacks such information, the repeater may use the dynamic scheme. It is appreciated that scheduling behaviour typically is a configuration of the network by the network manufacturer or by the network operator hence may normally be regarded as an unchanging characteristic which does not vary from one second to the next.

"In-Place" option—applicable for "physical" retransmission embodiment: The retransmitted signal is transmitted by the repeater onto the exact same resource blocks/bursts of the current frame/sub-frame that were allocated to the original UL transmission received by the base station from the mobile station that the repeater is serving or helping. The UL repeater does of course introduce some delay/latency however the UL repeater is typically configured such that the delay is low enough to ensure that the UL repeater's transmission remains within the time boundaries which allow the BS proper reception with no interfering with other signals. For example, in an OFDMA system the delay may be lower than a cyclic prefix duration because the equalizer is limited to the delay of Cyclic Prefix.

In TDMA or CDMA systems, the delay, may be lower than the maximal delay handled by the receiver EQUALIZER and may depend on the specific implementation of the receiver.

"Out-of-Place" option—applicable both for "physical" and for "logical" retransmission embodiments, e.g. as described in detail in examples 1-3 below: The retransmitted signal is transmitted by the repeater onto a different allocation of resource blocks/bursts, rather than onto the same allocation as of the original received UL transmission. Three examples of "Out-of-Place" transmission include:

"Out-of-Place" transmission Example 1: next sub-frame—applicable both for "physical" and for "logical" retransmission embodiments: In the case of a fixed allocation to the MS by the mobile station's scheduler, (either fixed in the sense of the same allocation in each frame or in each sub-frame, or fixed in the sense of the same allocation being allocated to the MS periodically e.g. once every known number N of sub-frames, or a fixed allocation being allocated to the MS once per several sub-frames.

It is appreciated that certain embodiments may be "out of place with fixed allocation", where fixed allocation refers to a fixed allocation of size/volume/location within the frame/ modulation parameters, which does not necessarily occur in the next sub-frame and does not necessarily involve a fixed latency.

Typically, in these cases, as long as the allocated resource blocks/bursts have an allocation location within the sub-frame and modulation properties (e.g. modulation scheme and coding scheme) which are the same as the original MS transmission which is to be repeated, the retransmitted signal may be transmitted by the repeater onto the same allocated resource blocks/bursts as the original received UL transmission, in one of the next (upcoming) sub-frames in which the MS has been allocated an opportunity to transmit, and not in the current sub-frame.

It is appreciated that various modulation and coding schemes are known in the art of modern digital communications and reflect, inter alia, the constellation order (e.g. qpsk, 16qam, 64qam etc.), and FEC code rate (e.g. ½, ⅓, ⅚, etc.).

A particular advantage of this embodiment is that the repeater effectively facilitates transmission by (say) MS 604, by utilizing an "empty" or "not important" part of the frame, which is allocated to MS 604 hence the BS understands this is to be transmission from 604 without necessarily being aware of the existence of the UL repeater. Since the UL repeater uses allocations granted to MS 604 by the BS, and transmits within those allocations, the UL repeater's transmissions are assumed, by the base station, to have been transmitted by MS 604 itself.

"Out-of-Place" transmission Example 2—applicable for "logical" retransmission embodiment—allocation position which differs from MS's current allocation position: In the case of an allocation position, allocated to the MS by its scheduler, which is dynamic rather than fixed (i.e. the allocation position within the sub-frame is dynamically changed between frames/sub-frames), then the retransmitted signal may be transmitted by the repeater onto the new allocation in one of the next sub-frames in which the MS is allocated with an opportunity to transmit (i.e. new allocation position within a new subframe). It is appreciated that there is a limitation that the allocation is of the same size and shares the same parameters as the MS being "helped" by the uplink repeater, e.g. as described elsewhere herein.

"Out-of-Place" transmission Example 3—elastic buffer/ queue applicable for "logical" retransmission embodiment: In the case of an allocation of a frame portion (aka position) to the MS by the mobile station's scheduler, that varies dynamically not only in its allocation position but also in the allocation volume/size or in the allocation modulation properties (e.g. modulation scheme or coding scheme), then the repeater may comprise an elastic buffer, or a queue of demodulated information bits, in which the mobile station's UL receiver stores the demodulated information bits. The UL transmitter then retransmits those information bits according to the new allocation position/size/properties, in one of the next sub-frames in which the MS is allocated with an opportunity to transmit (i.e. new allocation position within a new subframe). For example, if the information bits are too numerous to fit into the next sub-frame allocated to the MS, it is possible that the information bits will be transmitted in parts i.e. some in the next sub-frame and some in the sub-frame/s after that.

Optionally or alternatively, when using the "Out-of-Place" options, the UL repeater may implement an "Interleaved transmission" scheme e.g. as described elsewhere herewithin.

Alternatively or in addition, the UL repeater may according to certain embodiments incorporate a physical antenna separation, in order to reduce the self-interference to the repeater's UL receiver, caused by the repeater's own UL transmitter. In this embodiment the UL repeater's Tx antenna(s) is or are different from the Rx antenna(s), and the Tx and Rx antennas are each designed and installed to ensure physical separation (e.g. high attenuation) between the Tx antenna(s) to the Rx antenna(s). Such techniques for antenna separation are known in the art, e.g. "Improved Antenna Isolation in Transmit/Receive Applications" https://pdfs.semanticscholar.org/d8b1/ e37dc437b2f3bf9232e82799caf7966969fa.pdf Alternatively or in addition, the UL repeater may comprise an echo cancellation functionality using any suitable echo cancellation algorithm, in order to reduce the self-interference to the repeater's UL receiver, caused by the repeater's own UL transmitter. Such echo cancellation algorithms and techniques are known in the art, e.g.:

1. "Simultaneous Transmission and Reception: Algorithm, Design and System Level Performance" https://arxiv.org/pdf/1309.5546.pdf
2. http://www.tredess.com/en/cancelador-ecos
3. "Study on the Echo Cancellation Technology for DVB-T Repeater" https://rd.springer.com/chapter/10.1007/978-3-642-25769-8$_{13}$ 17

Referring now to FIG. 10, it is appreciated that the repeater's reception operation from the mobile station that the repeater is helping, is more complex than a conventional BS's RX operation from the mobile station that the BS is serving, due to at least the following difficulty resolved by certain embodiments shown and described herein:

UL transmissions of MA1, MS2, MS3, MS4 are received by the repeater with neither time synchronization nor power equalization: As an example, say MS1, MS2, MS3 and MS4 transmit UL signals within an UL frame to the BS. The BS ensures these transmissions are received at similar power levels using conventional power control mechanisms (either open loop or closed loop) between the BS and the MS e.g. to achieve power equalization between the respective mobile stations. Also, the BS ensures transmissions are received from the plural mobile stations in a relatively time synchronized manner, i.e. there is no (or there is minimal) interference/running over between one MS and other MS. This is achieved by conventional timing control mechanisms (e.g. "timing advance" mechanism) employed by conventional base stations, whereby the BS commands each MS to perform its transmission respectively earlier or later to ensure that the overall transmissions are received by the BS relatively (close enough) synchronized in time.

In contrast, in the case of the repeater, the various UL transmissions of MS1,MS2,MS3,MS4 are received by the repeater with no time synchronization (the mobile stations have been respectively synchronized to minimize interference at the base station but this synchronization typically causes non-trivial mutual interference (between the mobile stations) at the location of the repeater which is typically not co-located with the BS and with no power equalization, which causes a much greater level of interference between various UL transmissions, causing a problem which a conventional BS does not have to cope with. This is typically the case even in the embodiment of FIGS. 8-9. It is possible for the repeater to be co-located with the BS, however this would be ineffective. typically, e.g. as shown in FIG. 11.

The repeater is deployed at a location that is either physically intermediate BS and MS (the MS that the repeater is serving, and the BS that is serving both that MS and the repeater itself) or more generally a location which has a good communication link to both MS and BS in contrast with the less good communication link from MS to BS which causes the need to augment the MS's functioning using the repeater.

Also, note that, even in the embodiment of FIGS. 8-9, in contrast to the co-owned DL repeater patent document discussed in the Background section, which receives a single DL transmission from the BS, from a single source, the uplink repeater herein receives plural UL transmissions from plural respective sources. Therefore, suitable solutions are provided herein for problems which may ensue from the plural sources such as receipt of signals which are non-synchronized in amplitude and/or time.

It is appreciated that the UL transmitter 1030 (and repeater 605 as a whole) may be located at a geographical position selected by, say, the UL repeater operator or installer to ensure good reception by the BS 101.

In order to handle the above two difficulties, the UL repeater may use any suitable technical solution such as, for example, one or more of the following three technical solutions.

It is appreciated that any suitable solution may be employed to ensure that the Tx signal of the Repeater does not interfere with the operation of the Repeater Rx. For example:

a. An antenna array and/or beamforming schemes in order to better receive desired MS in the presence of the other (interfering) MSs. For example:

a-1. The location of the desired MS may be known, or provided to the UL repeater, such that it may configure its beamforming/antenna array to be directional in the direction of the known MS location, thereby to better receive the desired MS a-2. Alternatively, if the location of desired MS may be unknown or not provided to the repeater, the repeater may use adaptive tracking/adjusting algorithms to configure its beamforming/antenna array, to better receive the desired MS b. UL repeater may be equipped with higher quality HW relative to a conventional BS's uplink receiver), in order to overcome the difficulties described above and in order to enlarge its dynamic range for uplink reception. For example, it may use A/D components with 16 bit-A/D instead of 12 bit=A/D and/or the uplink receiver's RF components may have a lower noise figure (NF), than a conventional BS uplink receiver.

c. UL repeater may comprise any suitable conventional Interference Canceller (IC) algorithm in its receiver (1020 in FIG. 10), to better receive the desired MS.

The uplink repeater of FIG. 6 (or of FIG. 10) may for example perform some or all of the operations a-d described herein.

The Rx operation of the repeater is more complex than a conventional BS also due to the fact that according to certain embodiments, it receives the UL signal in a non-cooperative manner. The repeater, unlink the BS, does not know where and when to find a specific UL transmission, and what modulation parameters the specific UL transmission uses. However, this may be resolved e.g. if the repeater first receives the DL, containing the map, from the BS, then analyzes the map and tunes its UL receiver accordingly, to receive a specific MS allocation transmission, including tuning the modulation and coding scheme.

FIG. 10 is a semi-pictorial, semi-block diagram illustration of an UL (uplink) signal reception enhancement system which may serve as the repeater 605 of FIG. 6. In this embodiment, the repeater 605 comprises a DL (Downlink) receiver 1010, an UL receiver 1020, an UL transmitter 1030 and an uplink-transmission scheduling controller 1040.

It is appreciated that in the embodiment of FIG. 10, controller 626 is not centralized for all repeaters and instead a controller similar to controller 626 is co-located with each repeater which talks to the core. A centralized controller 626 may however allow a higher level of central control of several repeaters. it is appreciated that typically, controller 626 is cooperative with the BS, whilst the controllers 1040 are standalone controllers.

It is appreciated that, e.g. in FIG. 6, there need not be only one centralized controller 626 for all repeaters. Instead, there may be plural (e.g. 2 or 3 or 5 or any other suitable number) of controllers 626 for a single cell (I.E. per BS).

Referring again to FIG. 10, the dl-Rx 1010 may comprise any suitable dl-Rx e.g. such as a conventional LTE mobile station's receiver. Similarly, the ul-Rx may comprise may comprise any suitable ul-Rx e.g. such as a conventional LTE base station's receiver. Similarly, the ul-Tx may comprise any suitable ul-Tx e.g. such as a conventional LTE mobile station's transmitter.

Regarding the DL Rx (and UL Rx and Tx) of FIG. 10, it is appreciated that each category of modem/transmission protocol (e.g. LTE, 3g, WIMAX) has, in practice, its own "chain of processing" embodied in modems that are commercially available for that protocol.

For example, the Rx of FIG. 10 may be similar or identical to the Rx of the mobile station that the uplink repeater is serving (aka helping).

It is appreciated that the base station whose uplink reception is improved by the repeater need not be stationary and may for example be a mobile base station or base station functionality co-located with mobile station functionality, e.g. as described in co-owned WO 2011092698 to Benjamin Giloh, entitled "Cellular communication system with moving base stations . . . ", the disclosure of which is incorporated herein by reference.

It is appreciated that conceivably, a single receiver may be provided which is capable of receiving both UL and DL transmissions.

The DL receiver 1010 receives, demodulates and decodes at least portions of DL signal 602c of FIG. 6, which describes the mapping allocations of the UL transmissions (e.g. the UL-MAP signal in WiMAX 802.16), as described above regarding FIG. 6. The UL receiver 1020 receives at least portions of signal 608 of FIG. 6. The UL transmitter 1030 transmits the "repeated signal" 602d of FIG. 6, towards BS 101. Controller 1040 controls the operation of DL receiver 1010, UL receiver 1020 and UL transmitter 1030, e.g. by determining some or all of:

which portions of DL signal to receive and demodulate, which portions/allocations of the UL signal to receive/demodulate/store, in which allocations/modulation properties to re-transmit the UL repeated signal.

Controller 1040 may optionally comprise a suitably configured (in accordance with the logic and functionalities described herein) CPU, DSP, FPGA or ASIC. Controller 1040 determines inter alia when (which time-frequency region/s within each frame) the UL transmitter 1030 transmits, depending on map information extracted from signals received from the dl receiver 1010, and may alternatively or in addition have other functionalities. Controller 1040 may implement any one of the modes of operation described above regarding FIG. 6 (Physical/Logical retransmission, In-place/Out-of-place allocation).

Operation of UL transmitter 1030 is typically more complex than that of a conventional mobile station's transmitter e.g. due to the following 2 goals:

To be received to the BS properly

Not to interfere to the reception of other MS UL transmissions which need to be received by the BS within the same frame.

To ensure these goals are met, UL transmitter 1030 may differ from a conventional mobile station's uplink transmitter in one or more of the following aspects:

UL transmitter 1030 may estimate the required power level for its transmission to be received by BS 101 at the power level desired by BS 101 as expressed by BS 101's power control mechanisms. This estimation may be optionally based on information received from BS 101 by DL receiver 1010, and/or on information received from MS 604 by UL receiver 1020. Transmitter 1030 then may transmit its uplink signals at the estimated power level. E.g. BS power control mechanisms may send a command to the MS to increase its Tx level by (say) 1 dB, then the repeater may increase its Tx by the same 1 dB.

UL transmitter 1030 may estimate the time shift required for its transmission to be received by BS 101 at a proper timing synchronization, desired by BS 101 as expressed by BS 101's timing control mechanisms. This estimation may be optionally based on information received from BS 101 by DL receiver 1010, and/or on information received from MS 604 by UL receiver 1020. Transmitter 1030 then may transmit its uplink signals at the estimated time shift. E.g. BS timing control mechanisms may send a command to the MS to adjust (e.g. delay) its Tx by X nSec, then the repeater may delay its Tx by the same number of nSec.

UL transmitter 1030 may comprise multiple transmit antennas or an antenna array, which may enable the use of advanced antenna system techniques, such as but not limited to some or all of beam switching, beam-forming and other known in the art algorithms.

UL transmitter 1030 may comprise directional transmit antennas, e.g. high gain antennas (see e.g. antennae 606, 607 in FIGS. 6, 8-9).

Optionally, the location of the BS 101 may be known to the repeater e.g. because commercial BS locations in many countries are public domain information and/or because the operator who deployed the repeater was the same operator that deployed the base station serving the repeater.

In this case, the transmit directional antenna or antennas of UL transmitter 1030 may be set e.g. by the UL repeater operator or installer, to point to the direction of the BS 101 resulting in effective repeater transmission to the base station, relative to a situation in which only the mobile station transmits to the base station with no repeater, in that the repeater's transmission energy is entirely directed to the BS 101 whereas the mobile station's transmission energy is diffused in all directions UL transmitter 1030 (and repeater 605 as a whole) may be located at a geographical position selected by, say, the UL repeater operator or installer to ensure good reception by the BS 101.

UL transmitter 1030 may be equipped with "better" hardware (e.g. power amplifier with lower distortions and/or better (lower distortions and/or lower phase noise) up converters and/or better (e.g. e.g. higher stopband rejection) filters, than the conventional MS's typical hardware, thereby enhancing UL repeater 605's reception quality by BS 101. This is because the conventional MS is a very cost-sensitive device, being a consumer electronics product. In contrast, the repeater is typically far less subject to HW cost sensitivity therefore can use better HW than typical MS.

FIG. 11 illustrates the cellular communication system of FIG. 6, operating in a geographical environment including topographic obstacles, in accordance with further embodiments of the present invention. In this scenario, an obstacle 682 stands in the way of uplink signal 602*b* from mobile device 604 to base station 101, thus direct (line of sight) signal path 602*b* does not reach base station 101. However, other non-direct (non-line-of-sight) signal paths from mobile device 604 to base station 101 may still exist, such as path 602*e* from mobile device 604 to a second obstacle 684, a reflection caused by obstacle 684, and the path 602*f* from obstacle 684 to base station 101. This mechanism of non-line-of-sight transmissions is well known in the art and in cellular communications particularly. However, in some cases, the signal strength and/or quality of signal 602*f* is too poor for proper uplink reception by base station 101. According to certain embodiments, an UL repeater 605 is provided which aids base station 101 in receiving the uplink signals, as described above regarding FIG. 6.

In the scenario of FIG. 11, according to certain embodiments, which are useful e.g. to ensure that the repeater (which is helping/serving mobile station M by using the allocation of mobile station M) does not cause the repeater's own transmissions to become confused or interfere with M's transmissions, the base station 101 may receive, in superposition, uplink signals from the path 602*e*-602*f* and from the path 608-602*d*. Path 602*e*-602*f* may optionally have a larger propagation delay than path 608-602*d*. Optionally, UL repeater 605 introduces an adjustable or tunable delay in order to make the relative delay between paths 608-602*d* and 602*e*-602*f* smaller, thus facilitating base station 101's synchronization and/or equalization processes. This embodiment is further described hereinbelow with reference to FIGS. 8*a-d*. Obstacles 682 and 684 may be, for example, a mountain, row of buildings, or any other physical obstacle.

FIG. 8 is a semi-pictorial, semi-block diagram illustration of a cellular communication system in accordance with a further embodiment of the present invention. The system of FIG. 8 may be similar to the system of FIG. 6 however it also comprises a set of at least one and typically many communication modules 622 co-located with e.g. integrally formed with at least one and typically many UL repeaters 605 respectively, and communicating with a partial repeater central controller 626 via a communication link 624 e.g. via optical fiber. More generally, communication modules 622 and partial repeater central controller 626 may communicate through any suitable communication links e g cellular, WiMAX, optical fiber, microwave link or any other suitable protocol for communication links.

Each module 622 may comprise any conventional communication transceiver, e.g. modem.

Typically, communication module 622 and UL repeater 605 are co-located, together constituting unit 620. Optionally, they are integrally formed.

Typically, the partial repeater controller 626 (aka "core-cooperative external controller" and not to be confused with the controller deployed inside the repeater According to certain embodiments) is connected to and communicates with (and may even be co-located with) the cellular core network 150 via a communication link 154. Communication link 154 may comprise an optical fiber, a microwave link, a wired communication link, or may be implemented by any other suitable communication link technology. Typically, plural communication modules 622 (and hence units 620) are served by a single partial repeater central controller 626 e.g. all UL-repeaters 605 serving under the core network 150 may be served by a single external controller 626. Typically, partial repeater central controller 626 knows and/or has access to at least the following data:

1. which cell each mobile device is currently included in (i.e. which base station 101 serves each mobile device 604). This information is typically accessible to the controller 626 through the core network 150; and/or 2. reception quality measurements of the mobile devices 604, e.g. as sent by the mobile devices to base stations 101 and/or core network 150.

Typically, controller 626 controls the operation of at least one repeater 605. The control may for example include some or all of the following aspects of repeater 605 operation:

a. Turning UL repeater transmission on or off
    b. Which base station 101 the repeater should receive
    c. Which mobile device 604 (or mobile devices) to receive and repeat
    d. At which power level to transmit
    e. Beam-forming parameters (e.g. antenna weights) for receiving mobile device 604
    f. Beam-forming parameters (e.g. antenna weights) for transmitting the repeated signal In the embodiment of FIG. 6 in which module 626 is lacking, aspects a-f above may be determined in any suitable manner e.g. By pre-configuration, user manual updates, or a suitable control algorithm within the repeater.

It is appreciated e.g. as aforesaid a plurality of units 620 may be provided, each including a communication module 622 co-located with e.g. integrally formed with UL repeaters 605, however for simplicity, only one unit 620 is shown in FIG. 8.

FIG. 9 is a semi-pictorial, semi-block diagram illustration of a cellular communication system in accordance with a further embodiment of the present invention. The system of FIG. 9 may be similar to the system of FIG. 8 however in FIG. 9, communication module 622 and partial repeater central controller 626 each comprise, to facilitate their communication with each other, a mobile communication device, and the communication between communication module 622 and partial repeater central controller 626 occurs over the cellular network. Alternatively, communication module 622 comprises a mobile communication device and partial repeater central controller 626 comprises an application server connected to the core such that partial repeater central controller's communication link with each unit 620 may be one of the cellular links of the network. Optionally, the mobile communication device 622 may comprise an external cellular mobile device connected to repeater 605 via an interface such as but not limited to USB, infra-red, WiFi, Bluetooth. Alternatively, the mobile communication device 622 may be integrated into the repeater 605 thus may use the repeater's internal hardware resources, such as but not limited to antennas, RF circuits, modem hardware.

According to certain embodiments, controller 626 in FIGS. 8-9 makes independent decisions about each of its many repeaters but this is not necessarily the case. For example, if the logic of controller 626 does make independent decisions about each repeater, the controller 626 may, say, command repeater #1 to help MS #77 and command repeater #2 to help MS #78. Alternatively, however, the logic of 626 may generate a single policy executed cooperatively by plural repeaters e.g. help #77 and #78 whenever possible.

The repeater's signal may optionally use highly directional antennas/beamforming/high Tx Power (where "high" is taken relative to non-directional antenna used by conventional mobile stations), configured and operative to ensure that the reception at the base station will, for the main, be the repeated signal, the "original" mobile station signal constituting, relatively speaking, "minor interference". This is useful e.g. to ensure that the repeater (which is helping/serving mobile station M by using the allocation of mobile station M) does not cause the repeater's own transmissions to become confused or interfere with M's transmissions. The Tx of the uplink aka UL repeater may use high (where "high" is taken relative to non-directional antenna used by conventional mobile stations) gain antenna aimed to the base station aka BS, especially in cases where it is a static device (i.e. not moving). The mobile station may use omni- (all-) directional antenna, since due to its being in motion the mobile station may not be able to cannot aim its antenna towards the base station and/or may, much of the time, have no line-of-sight to BS. The same, mutatis mutandis, may hold for beamforming.

It is appreciated that the repeater may have selectable modes of operation e.g. fixed vs. non-fixed and/or in-place vs. out-of-place, and may include a user interface via which an end-user, or logic in the system itself may select modes of operation. Alternatively, the repeater may have a single mode of operation determined by the product designer, which may be fixed or non-fixed, in-place or out-of-place. For example, a repeater may be deployed by a cellular operator who knows that in her or his network the scheduler governing allocation provides only fixed allocations and never provides (e.g. is not configured to provide) non-fixed allocations. In this case, the repeater may have only a fixed mode of operation and no non-fixed mode of operation.

It is appreciated that the "partial" repeater herein is typically deployed, e.g. as an add-on and e.g. even without any cooperation on the part of the base station to which the partial repeater may be transparent, in order to help or serve the occasional mobile station which is experiencing poor quality of service.

Typically, each repeater is installed in a location which enjoys good communication with both the MS which is experiencing poor quality of service, and the BS which is serving that MS. Repeaters may be installed in any cell in which at least one MS is deemed (e.g. by the installer) to be deserving of help or service from the repeater, due to the poor quality of service being provided it by the base station.

However alternatively, the "partial" repeater shown and described herein could even be used to provide its services to all mobile stations rather than only to some, e.g. because a cellular operator has placed its BS inadequately e.g. in a poor location, and it is not currently feasible to re-deploy this base station in another position or to add another BS.

It is appreciated that a repeater may be mobile which may result in a degradation in that a mobile repeater is not always in an optimal position and therefore, inter alia, it is not possible to provide optimal directional antennas as described herein.

A particular advantage of certain embodiments is that the uplink repeater performs its functionality while availing itself only of the allocations to the MS being served by the uplink repeater, whether by using the same physical allocation, as in the "In-Place" embodiments described herein, or by using "future" allocations to the MS being served as in the "Out-of-Place" embodiments described herein. This allows the uplink repeater to operate despite the fact that the allocations are a given—since they are determined by the scheduler of the base station serving the MS which the uplink is serving.

It is appreciated that there need not be only one repeater per cell/BS. There may for example be several centralized controllers 626 for all repeaters. There may be plural controllers 626 for a single base station/cell.

It is appreciated that in contrast to embodiments in the downlink repeater described in co-owned patent application by applicant, the region to be repeated is dynamic e.g. per-frame since the allocations within the frame to one mobile station rather than another varies between frames. in contrast, in downlink repeaters, typically, at least the control signals have a fixed location within all frames. Nonetheless, it turns out, as described herein, that providing a UL repeater is feasible e.g. by virtue of map-reading functionality as described herein.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operation and instead, the remote processor P itself may receive output/s of portion/s of the operation from yet another processor/s P', may be deployed off-shore relative to P, or "on a cloud", and so forth.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution may include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order, may be provided separately or in any suitable subcombination or in a different order. For example, repeater control software constructed and operative in accordance with any of the control functionality described herein, may run on legacy or 3$^{RD}$ party hardware.

"e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A method for repetition of uplink transmissions, the method comprising:
   a) providing a repeater apparatus, having a controller, a downlink receiver and an uplink transmitter and receiver, and using the downlink receiver to receive a downlink DL signal from a base station BS whose cell the uplink repeater is serving, and, for at least one downlink frame D thus received:
   b) using the controller to demodulate at least a portion of said downlink frame D and to extract therefrom, MAP_D data describes allocation of an uplink UL transmission in at least one upcoming uplink frame to be transmitted after the at least one downlink frame D;
   c) using the controller to determine a subset of UL transmission allocations to be repeated thereby to define a subset of mobile stations in said cell, whose uplink transmissions the repeater apparatus is to repeat, the subset of mobile stations including at least one mobile station M which is being helped,
   d) using said uplink receiver for receiving content in said subset of UL transmission allocations to be repeated, from each mobile station in said subset of mobile stations, and repeating said subset of UL transmission allocations to be repeated by commanding said UL transmitter to send said content,
   wherein the repeater apparatus helps the at least one mobile station M by transmitting onto at least one allocation of the base station BS to the at least one mobile station M.

2. A method according to claim 1, wherein said repeating includes sending said content in said time-frequency regions within an upcoming uplink frame which follows immediately after said downlink frame D.

3. A method according to claim 1, wherein said repeating includes sending said content in said time-frequency regions within a subsequent uplink frame which follows an upcoming uplink frame which follows immediately after said downlink frame D.

4. A method according to claim 1, wherein said portion of said downlink frame D comprises a sub-frame.

5. A method according to claim 1, wherein said subset of allocations was decided in advance and stored in a repeater memory accessible by the controller and wherein said using the controller to determine the subset comprises retrieving said subset.

6. A method according to claim 1, wherein said using the controller to determine the subset of UL transmission allocations to be repeated comprises deciding, on-the-fly, by analyzing said DMAP_D data, which UL transmission allocations are to be repeated hence belong to said subset of UL transmission allocations to be repeated.

7. A method according to claim 1, wherein for at least one individual mobile station in said subset of mobile stations, said time-frequency region within an uplink frame, in which said individual UL transmission allocation in said subset will be repeated, comprises a time-frequency region allocated to said individual mobile station.

8. A method according to claim 1, wherein said MAP_D data describes allocation of UL transmissions in an upcoming uplink frame to be transmitted immediately after downlink frame D.

9. A method according to claim 1, further comprising determining respective allocations within an uplink frame, in which to repeat UL transmissions of respective mobile stations in said subset of mobile stations respectively and wherein said content is sent by said UL transmitter in said allocations respectively.

10. A method according to claim 9, wherein said allocations comprise respective time-frequency regions.

11. A method according to claim 1, wherein the repeater apparatus alternates between:
   silent periods in which the repeater's uplink receiver receives from a mobile station that the repeater is serving, without interference from the repeater's Tx signal because the repeater does not transmit during the silent periods, and
   transmission periods in which the repeater repeats signals received from at least one mobile station MS during previous silent periods, and wherein at least one signal received from a given mobile station M, during an allocation A is repeated by the repeater in a transmission period coinciding with a "subsequent" allocation which is granted to the mobile station M by the BS subsequent to said allocation A.

12. A method according to claim 1, wherein repeating an original uplink signal comprises retransmitting, including transmitting the original uplink signal as received.

13. A method according to claim 12, wherein said transmitting comprises "in-place" transmission onto an original allocation, in a current at least sub-frame, allocated to the original uplink signal received by the base station from the mobile station that the repeater is serving.

14. A method according to claim 1, wherein repeating an original uplink signal comprises amplifying the original uplink signal thereby to generate an amplified signal and transmitting said amplified signal.

15. A method according to claim 1, wherein repeating an original uplink signal comprises demodulating said original uplink signal and extracting the original uplink signal's information bits, remodulating said information bits and reconstructing the original signal accordingly thereby to generate a reconstructed signal and transmitting said reconstructed signal.

16. A method according to claim 15, wherein transmitting comprises "out-of-place" transmission onto an original allocation, allocated to the original uplink signal received by the base station from the mobile station that the repeater is serving, in a subsequent at least subframe rather than in a current at least sub-frame.

17. A method according to claim 15, wherein said transmitting comprises "out-of-place" transmission onto a new allocation allocated to the mobile station that the repeater is serving within a subsequent at least sub-frame, rather than to an original allocation, in a current at least sub-frame, allocated to the original uplink signal received by the base station from the mobile station that the repeater is serving.

18. A method according to claim 15, wherein allocation varies not only in terms of position but also in terms of at least one of volume and modulation scheme and coding scheme and wherein the repeater comprises an elastic buffer operative to store information bits and wherein said transmitting comprises "out-of-place" transmission in at least one new allocation to the mobile station being helped, in at least one subsequent subframe.

19. An uplink signal reception enhancement system operative to repeat at least a portion of at least one uplink transmission, the system being operative in conjunction with a cellular communication network having plural mobile stations transmitting uplink signals which are received by a base station which transmits downlink signals including uplink time-frequency allocation maps, the apparatus comprising:
   a downlink receiver dl-Rx;
   an uplink receiver ul-Rx;
   an uplink transmitter ul-Tx; and
   a controller communicating with the receivers dl-Rx and ul-Rx and with the transmitter ul-Tx, and configured
      to control the dl-Rx to receive at least a portion of at least one downlink signal including at least one map transmitted to the dl-Rx over a downlink,
      to control the ul-Rx to receive and de-modulate at least a portion of at least one uplink signal transmitted to the ul-Rx by at least one mobile device/station and to extract at least a portion of an uplink time-frequency allocation map from the uplink signal and to control the ul-Tx to repeat at least a portion of at least one uplink signal received by the ul-Rx, including using said map to determine a time-frequency frame location at which to transmit said uplink signal,
   thereby to provide partial repeater functionality operative to enhance quality of reception, by said base station, of at least a portion of at least one uplink signal received by said uplink receiver,
   wherein the partial repeater functionality helps the at least one mobile station by transmitting onto at least one allocation, by the base station, to the at least one mobile station.

20. A system according to claim 19, wherein a configurable antenna array and/or at least one configurable beamforming scheme is provided and is configured by the system to enhance, despite presence of other interfering mobile stations, the uplink receiver's quality of reception from at least one given mobile station whose uplink signal reception by the base station is to be enhanced.

21. A system according to claim 20, wherein the given mobile station's location is known to the system, and wherein the controller configures said beamforming scheme or said antenna array to improve uplink reception from the given mobile station, according to the location thereof.

22. A system according to claim 21, wherein the controller uses adaptive tracking/adjusting algorithms to configure said beamforming scheme or said antenna array, to improve uplink reception from the given mobile station.

23. A system according to claim 19, wherein a unique identification of at least one given mobile station whose uplink signal reception by the base station is to be enhanced, is provided to the system by an external source.

24. A system according to claim 19, wherein a unique identification of at least one given mobile station whose uplink signal reception by the base station is to be enhanced is determined by internal system logic.

25. A system according to claim 24, wherein the unique identification comprises location of said given mobile station.

26. A system according to claim 19, wherein the ul-Rx includes an Interference Canceller (IC) algorithm operative to improve uplink reception quality from at least one given mobile station whose uplink signal reception by the base station is to be enhanced.

27. A system according to claim 19, wherein the controller is operative to control the ul-Tx to repeat only a portion of at least one uplink signal received by the ul-Rx, including using said map to determine a time-frequency frame location at which to transmit said uplink signal, thereby to provide partial repeater functionality operative to enhance quality of reception, by said base station, of only a portion of at least one uplink signal received by said uplink receiver.

28. A computer program product, comprising a non-transitory tangible computer readable medium having computer readable program code embodied therein, said computer readable program code adapted to be executed to implement a method for repetition of uplink transmissions, the method comprising:
   a) providing a repeater apparatus, having a controller, a downlink receiver and an uplink transmitter and receiver, and using the downlink receiver to receive a downlink DL signal from a base station BS whose cell the uplink repeater is serving, and, for at least one downlink frame D thus received:
   b) using the controller to demodulate at least a portion of said downlink frame D and to extract therefrom, MAP_D data describes allocation of UL transmissions in at least one upcoming uplink frame to be transmitted after downlink frame D;
   c) using the controller to determine a subset of UL transmission allocations to be repeated thereby to define a subset of mobile stations in said cell, whose uplink transmissions the repeater apparatus is to repeat, the subset of mobile stations including at least one mobile station M which is being helped,
   d) using said uplink receiver for receiving the said subset of UL transmission to be repeated, aka content, from each mobile station in said subset of mobile stations and repeating said subset of UL transmission to be repeated by commanding said UL transmitter to send said content,
   wherein the repeater apparatus helps the at least one mobile station M by transmitting onto at least one allocation of the base station BS to the at least one mobile station M.

* * * * *